(12) United States Patent
Kubota

(10) Patent No.: US 7,346,536 B2
(45) Date of Patent: Mar. 18, 2008

(54) PURCHASE SUPPORT SYSTEM

(75) Inventor: Kazumi Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 504 days.

(21) Appl. No.: 09/789,676

(22) Filed: Feb. 22, 2001

(65) Prior Publication Data

US 2002/0049649 A1 Apr. 25, 2002

(30) Foreign Application Priority Data

Oct. 19, 2000 (JP) .............................. 2000-319677

(51) Int. Cl.
*G06F 17/30* (2006.01)
(52) U.S. Cl. .............................. 705/10; 705/7; 705/14; 705/26
(58) Field of Classification Search .................. 705/10, 705/14, 26, 27, 28, 29, 11, 7
See application file for complete search history.

(56) References Cited

U.S. PATENT DOCUMENTS

| | | | | |
|---|---|---|---|---|
| 5,124,911 | A | * | 6/1992 | Sack ........................... 705/10 |
| 5,950,172 | A | * | 9/1999 | Klingman .................... 705/26 |
| 5,950,173 | A | * | 9/1999 | Perkowski ................... 705/26 |
| 5,974,396 | A | * | 10/1999 | Anderson et al. ............. 705/10 |
| 6,014,634 | A | * | 1/2000 | Scroggie et al. .............. 705/14 |
| 6,026,370 | A | * | 2/2000 | Jermyn ........................ 705/14 |
| 6,055,573 | A | * | 4/2000 | Gardenswartz et al. ..... 709/224 |
| 6,078,892 | A | * | 6/2000 | Anderson et al. ............. 705/10 |
| 6,102,287 | A | * | 8/2000 | Matyas, Jr. ................. 235/380 |
| 6,129,274 | A | | 10/2000 | Suzuki |
| 6,233,564 | B1 | * | 5/2001 | Schulze, Jr. ................. 705/14 |

(Continued)

FOREIGN PATENT DOCUMENTS

| | | |
|---|---|---|
| JP | 09/171450 | 6/1997 |
| JP | 2000-112924 | 4/2000 |
| JP | 2000-123036 | 4/2000 |
| JP | 2000-268093 | 9/2000 |

OTHER PUBLICATIONS www.epinions.com, (1999) Wayback machine archive.*
Japanese Office Action regarding Japanese Patent Application No. 2001-308089 (4 pgs).
Decision to Reject in corresponding Japanese Patent Application No. 2001-308089, mailing date Mar. 13, 2007.
Decision to Reject in corresponding Japanese Patent Application No. 2001-308089, mailing date Mar. 13, 2007.

*Primary Examiner*—F. Zeender
*Assistant Examiner*—M. Thein
(74) *Attorney, Agent, or Firm*—Staas & Halsey LLP

(57) ABSTRACT

A general customer logs in to the system, proceeds from the main menu to the merchandise selection menu, and selects the merchandise he wants to purchase. At that time he refers to the information concerning the combinations of the merchandise he desires and the merchandise combinations. These pieces of information are provided by charisma customers selected from among general customers. A charisma customer has a privilege such as a preferential purchase of merchandise at a low price, but in return he has an obligation to feed information concerning merchandise back to the system, namely the party selling the merchandise. The general customer can make an accurate purchase of the merchandise he wants to purchase based upon useful information provided from the charisma customers.

25 Claims, 17 Drawing Sheets

U.S. PATENT DOCUMENTS

| | | | |
|---|---|---|---|
| 6,317,722 B1 * | 11/2001 | Jacobi et al. | 705/14 |
| 6,405,175 B1 * | 6/2002 | Ng | 705/14 |
| 6,826,540 B1 * | 11/2004 | Plantec et al. | 705/10 |
| 6,963,848 B1 * | 11/2005 | Brinkerhoff | 705/10 |
| 2001/0037206 A1 * | 11/2001 | Falk et al. | 705/1 |

* cited by examiner

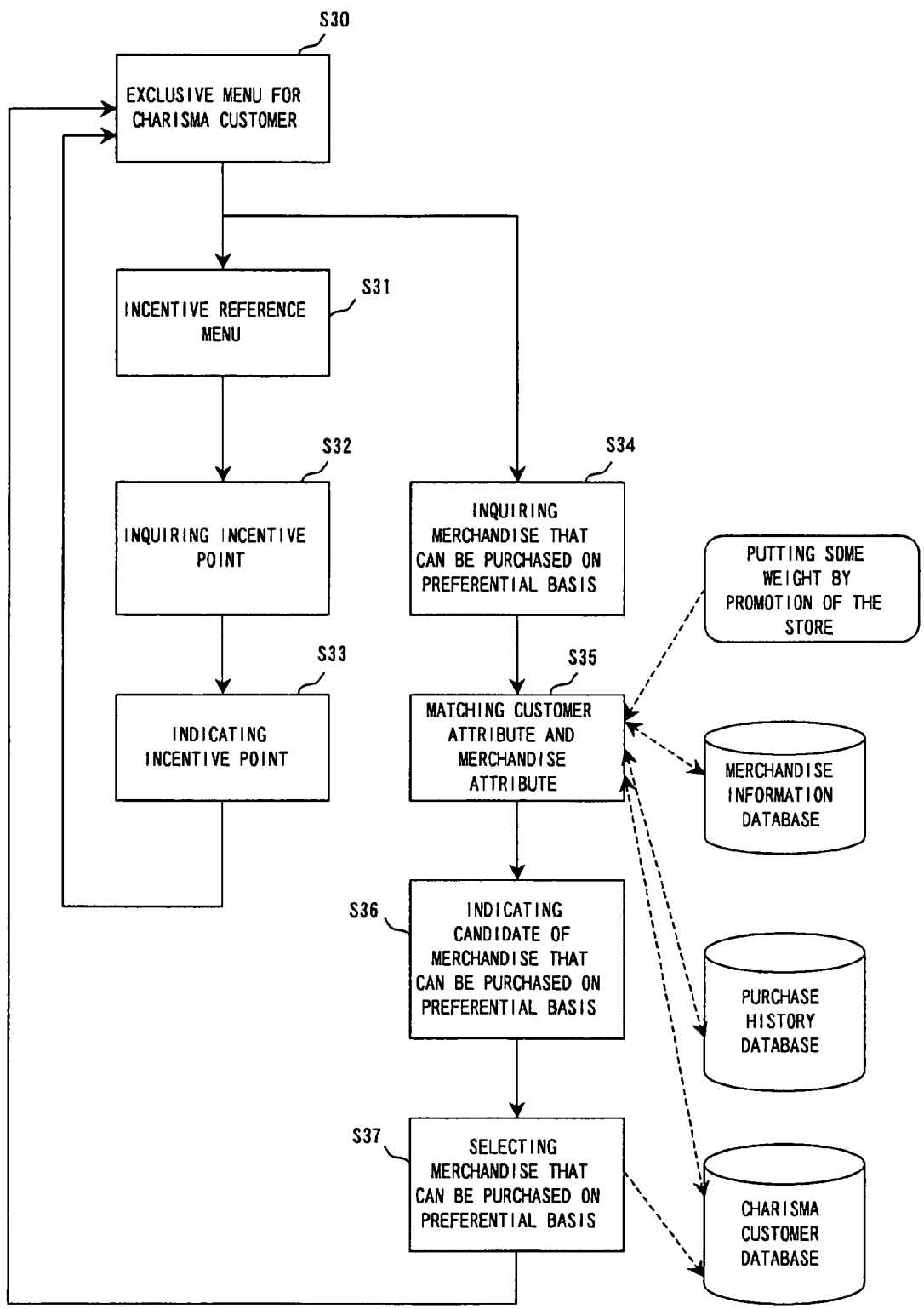
F I G. 3

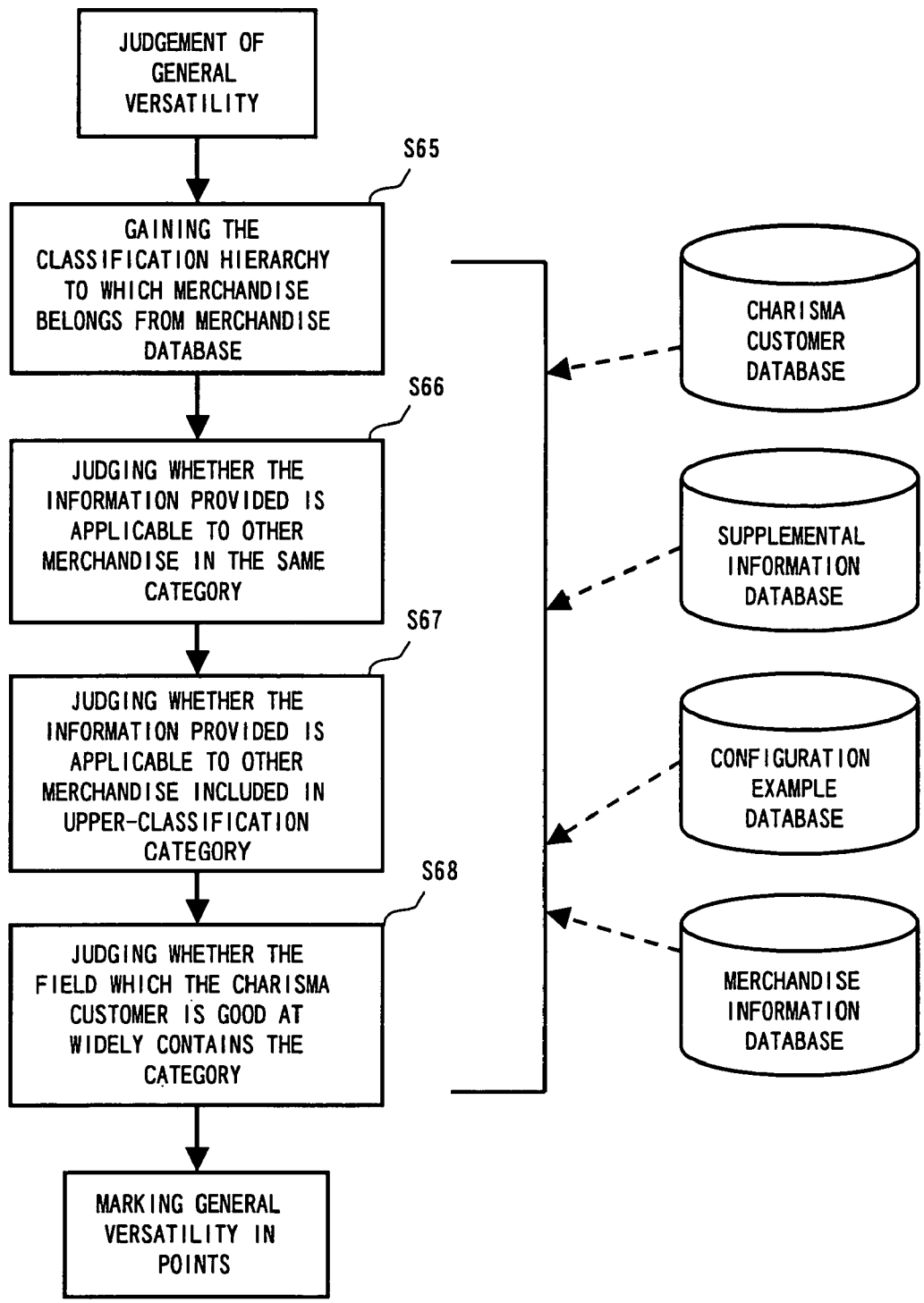
F I G. 6

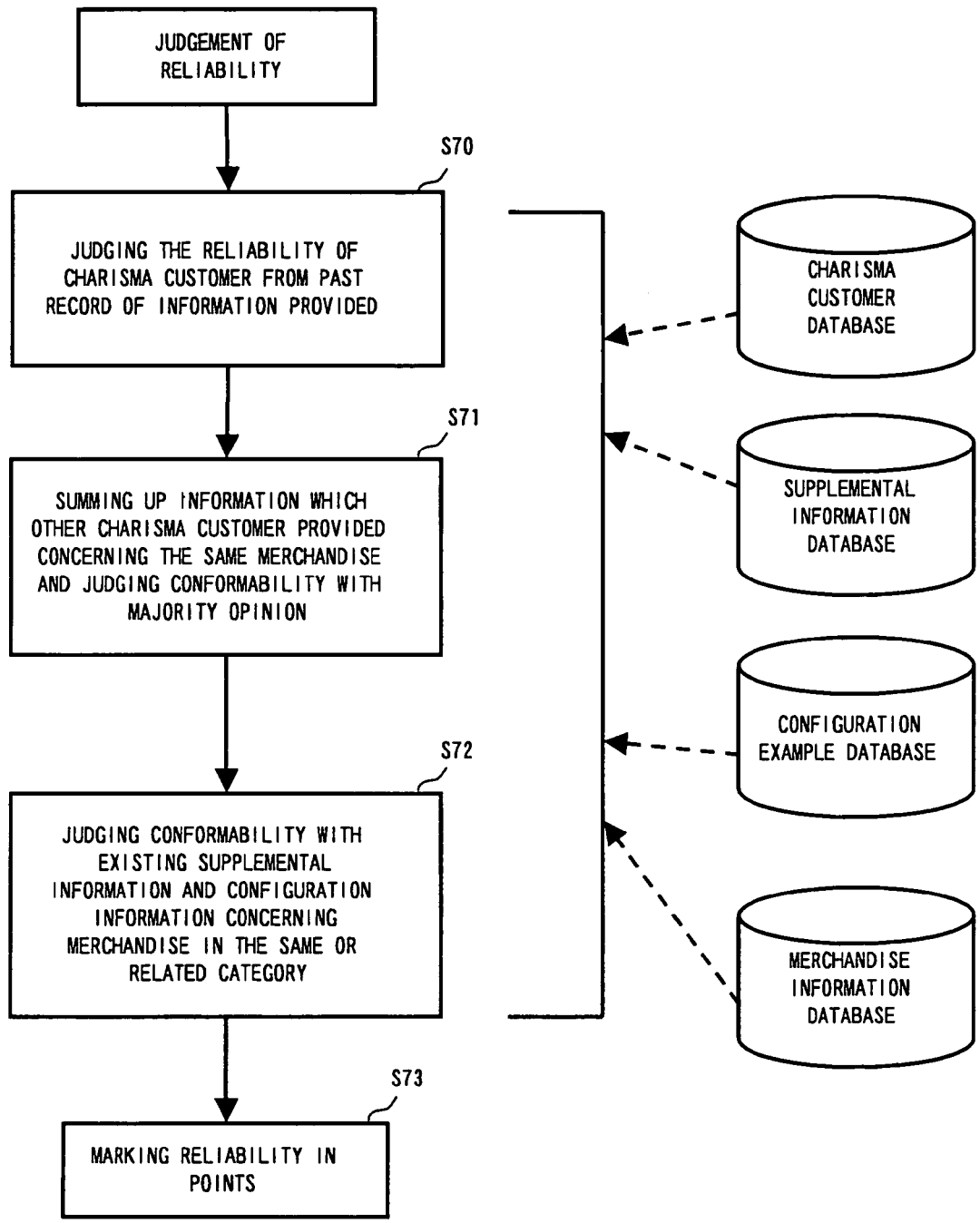
F I G. 7

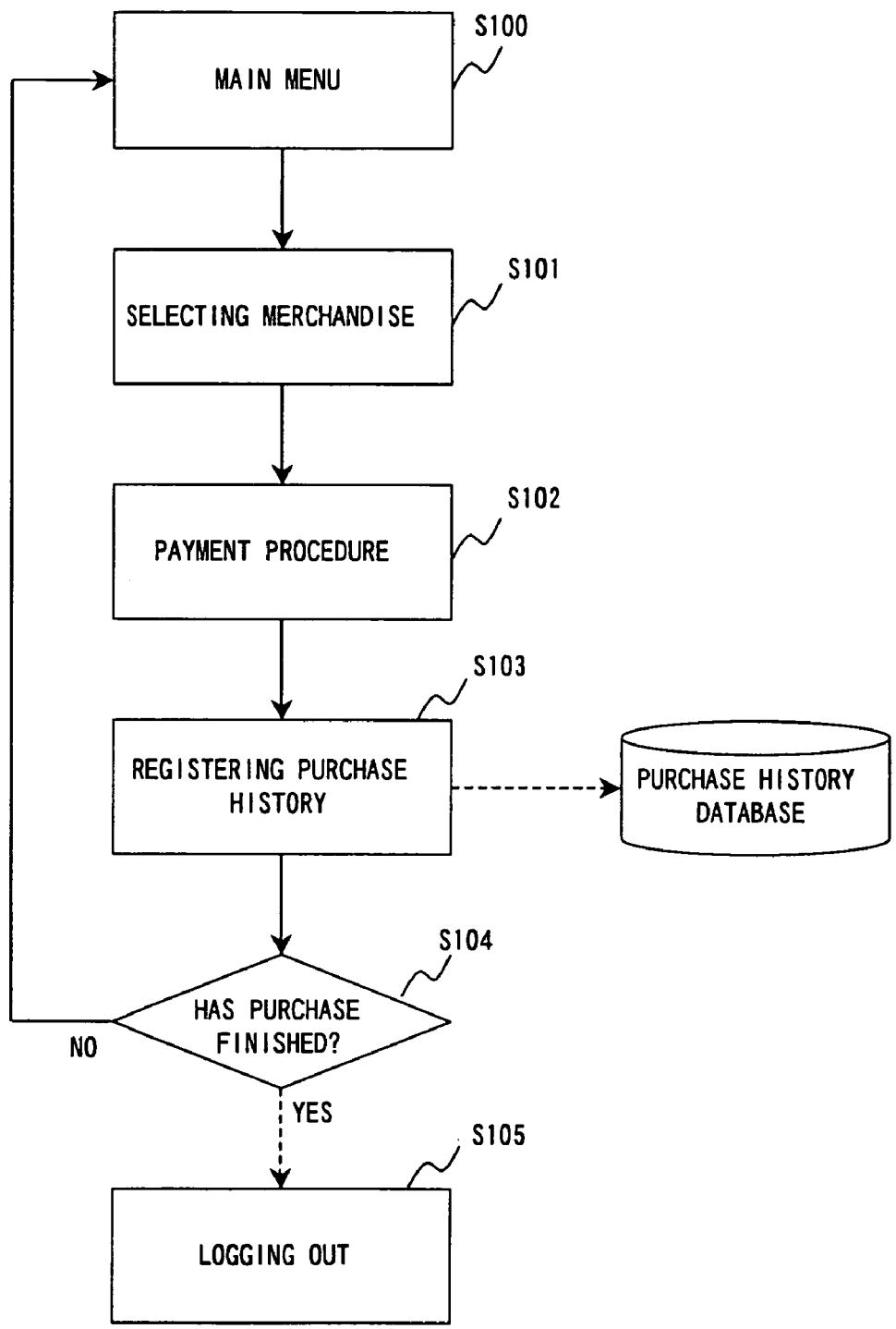
F I G. 1 1

FIG. 12

GENERAL CUSTOMER DATABASE

| CUSTOMER ID | CUSTOMER NAME | ADDRESS | SEX | AGE | HOBBY | INTEREST | PURCHASE HISTORY | | | |
|---|---|---|---|---|---|---|---|---|---|---|

CHARISMA CUSTOMER DATABASE

| CUSTOMER ID | CUSTOMER NAME | ADDRESS | SEX | AGE | HOBBY | INTEREST | PURCHASE HISTORY | FIELD HE IS GOOD AT | INCENTIVE | PREFERENTIAL PURCHASE | FEEDBACK INFORMATION |
|---|---|---|---|---|---|---|---|---|---|---|---|

MERCHANDISE INFORMATION DATABASE

| MERCHANDISE ID | MERCHANDISE NAME | CLASSIFICATION | SUPPLEMENTAL INFORMATION | CONFIGURATION INFORMATION | PRICE | CHARISMA CUSTOMER | DATE AND TIME OF REGISTRATION |
|---|---|---|---|---|---|---|---|

PURCHASE HISTORY DATABASE

| PURCHASE ID | CUSTOMER ID | MERCHANDISE ID | QUANTITY | SIMULTANEOUS PURCHASE | SUPPLEMENTAL INFORMATION | CONFIGURATION EXAMPLE | DATE AND TIME OF PURCHASE |
|---|---|---|---|---|---|---|---|

SUPPLEMENTAL INFORMATION DATABASE

| SUPPLEMENTAL INFORMATION ID | MERCHANDISE ID | INFORMATION AT THE TIME OF SELECTION | SIMULTANEOUS PURCHASE | CONFIGURATION INFORMATION | PROBLEM INFORMATION | SUITABLE CUSTOMER INFORMATION | DATE AND TIME OF REGISTRATION | REFERENCE FREQUENCY | USEFULNESS |
|---|---|---|---|---|---|---|---|---|---|

CONFIGURATION EXAMPLE DATABASE

| CONFIGURATION ID | CONFIGURATION NAME | CHARISMA CUSTOMER | CONFIGURATION MERCHANDISE ID | SUITABLE CUSTOMER | SUPPLEMENTAL INFORMATION | CONFIGURATION-IMPOSSIBLE MERCHANDISE | DATE AND TIME OF REGISTRATION | REFERENCE FREQUENCY | PURCHASE FREQUENCY | USEFULNESS |
|---|---|---|---|---|---|---|---|---|---|---|

PURCHASE SUPPORT SYSTEM

BACKGROUND OF THE INVENTION

1. Field of the Invention

The invention relates to a method for providing various types of purchase support when customers purchase merchandise via a network such as the Internet or World Wide Web.

2. Description of the Related Art

The number of customers of retail stores who possess personal computers has increased in recent years. Many of them have become able to access a computer network service that provides a connection to the Internet and World Wide Web (hereinafter called WWW). A customer of a store can purchase merchandise on line via the WWW at a place where a personal computer is installed without moving from his home. In other words, an Internet shopping service is beginning.

This service is provided not only by existing general retail stores but by manufacturers and shopping malls as well. While manufacturers sell merchandise directly to customers, and shopping malls formed to provide space for a number of different industries and merchandise sell merchandise to customers, a system or service that carries out such a sales-related task as order intake, settlement of payment and customer management on behalf of the manufacturers or the shopping malls has been provided.

In such a system, when a customer selects merchandise he wants to purchase from among merchandise which can be purchased, he selects merchandise from a voluminous merchandise catalog and purchases it. In order to realize this system, the party that provides the shopping service (hereinafter called store) provides the customer with information on the specifications, appearance and so forth of merchandise, and provides an interface to retrieve merchandise information by designating the kind, name, type and so forth of the merchandise the customer wants to purchase.

A sales supporting system wherein customers' tastes and demands are accumulated as customer information, matching of the customer information with the merchandise information is conducted, and then a store proposes candidates of recommended merchandise to customers, already exists as a publicly known system.

As merchandise sales on the Internet expand, the kind of merchandise and the merchandise itself become complicated. Moreover, the customer has to view the merchandise information on the WWW in advance and has to judge which merchandise he should purchase, although in the past the customer could obtain explanations about merchandise and information necessary for his merchandise selection on a face-to-face sales basis in are tail store. Basic information such as specifications, appearance, precautions to be observed at the time of purchase and so on of these pieces of merchandise information are usually provided to customers, but in the case of the merchandise that is used in combination with multiple peripheral devices, as is the case with a personal computer, there is a problem of compatibility among the devices to be connected to one another. In particular, a question occurring at the time of purchase as to whether product A1 manufactured by A company and product B1 manufactured by B company can be connected and used is not made clear, in many cases, either in the merchandise information provided by A company or in that provided by B company. It is difficult, therefore, for a customer to obtain necessary information when selecting this kind of merchandise, increasingly resulting in problems like returning the purchased merchandise due to problems occurring after purchase.

In the case of apparel-related merchandise such as clothes and clothing accessories, when a customer selects the merchandise he wants to purchase from among many items of merchandise, it is difficult for him to express his tastes in simple terms, even if an interface is provided to individually select merchandise merely by color, shape and kind. Instead, which merchandise he really wants to purchase is often not determined yet at the time he is selecting it. So, he sometimes selects the merchandise he wants to purchase while actually perusing the merchandise. Also, the customer not only selects merchandise in each individual category like the shirt, skirt or bag category, but also his method for selecting merchandise becomes uniform, because he has not yet realized to select merchandise while considering the merchandise configuration like an accessory appropriate for "this suit" or an accessory suitable for "my image," which used to prevail in face-to-face sales.

To solve such a problem as this, in the former case, for instance, each major manufacturer selects products manufactured by some other manufacturers as the ones which it will recommend to go with its own products, actually connects them, tests the operation of the connected products independently and provides customers with the merchandise information as part of its merchandise information. Or it offers to customers an example of constructing a system which comprises only its own products to help customers select suitable merchandise at the time of purchase. In reality, however, many customers want to use the said product to connect to another manufacturer's products to which they have already been introduced, so it is not easy to obtain the connectability of the products in the configuration of the products that they desire from only the merchandise information the manufacturer provides.

What can be commonly said from the two examples given above is that information currently available is chiefly merchandise information of each individual piece of merchandise, though a customer who purchases merchandise not only wants to purchase that merchandise individually when he purchases it, but also he wants to have information on the connectability of the merchandise to the product he has already purchased, or on the connectability between the merchandise he purchases now, or on the connectability of the said merchandise to products that he may purchase in the future, all of which are very important for him.

Now, let's think of the problems that occur on the part of the party who sells merchandise. If the seller tries to provide the customer who purchases merchandise with such merchandise information as mentioned above concerning the configuration of merchandise or examples of the combination of merchandise so that the customer can use the information for reference when selecting merchandise, the cost required for supplying the merchandise information with regard to the combination of merchandise becomes enormously high. In the case of the above-mentioned example of the combination of a personal computer with peripheral devices, there are such a large number of products manufactured by other manufacturers that it is practically impossible to confirm the operation of the products combined in various configurations. In addition, there are such variety in customer demand that a huge cost is incurred to listen to their demands and offer the configuration of merchandise that satisfies them, thus making it impossible to sell merchandise at a low price by suppressing the seller's margin of profit, which is a large merit of Internet shopping.

Some manufacturers are making an attempt to automate this service within their own product lines, but the present situation is that almost no effective answer has yet been obtained for the combined configuration of a plurality of products manufactured by many manufacturers.

This invention relates to a purchase supporting system and method wherein a seller provides a customer with information on the configuration and combination of merchandise at the time of purchase so that the customer can avoid selecting a wrong configuration which results in failure of the operation of the purchased products, or in purchasing unnecessary merchandise, and which, when the customer selects the merchandise he wants to purchase from among a number of pieces of merchandise, helps the customer select such a kind of merchandise that he cannot express his desire for merely by designating simple selection parameters required for an individual piece of merchandise, and provides him with merchandise information by suppressing the cost required for providing the merchandise configuration, which is a merit of the party selling merchandise.

SUMMARY OF THE INVENTION

Therefore, the purpose of this invention is to provide a purchase supporting method that can properly cope with the needs of purchasers and reduce the cost of sellers.

This invention is a purchase supporting method wherein a seller provides a customer with information that complies with his needs so that he can purchase merchandise more effectively. The method has the following three steps: the particular customer selection step that selects particular customers from among general customers, the merchandise information collection step that collects information concerning the merchandise which the particular customers purchased, and the information presentation step that presents information obtained from the particular customers to general customers when general customers purchase merchandise.

As this invention makes it possible to obtain detailed merchandise information (feedback information) from particular customers (charisma customers) selected from among general customers, general customers can select the merchandise and the merchandise configuration or combination complying with their needs based upon the information from charisma customers as well as referring to precautions to be observed at the time of purchase, thus enabling general customers to purchase merchandise with much fewer errors.

Since the store does not need to produce merchandise information voluntarily, it can cut down the cost related to the sale of merchandise.

BRIEF DESCRIPTION OF THE DRAWINGS

FIG. 3 is a flowchart showing the process of providing the charisma customer with an incentive such as a preferential sale, trial use or discount sale of new merchandise.

FIG. 6 is a flowchart showing the process of judging the general versatility of the supplemental information and configuration information of the merchandise that the charisma customer fed back to the store.

FIG. 7 is a flowchart showing the process of judging the reliability of the supplemental information and configuration information of the merchandise that the charisma customer fed back to the store.

FIG. 11 is a flowchart showing the process of executing the procedure for selling the merchandise that a general customer selects as the merchandise he wants to purchase.

FIG. 12 is a data schematic showing a configuration example of a merchandise configuration management database to provide information on the merchandise configuration and precautions to be observed at the time of purchase, thus helping the customer select the merchandise he wants to purchase.

DESCRIPTION OF THE PREFERRED EMBODIMENTS

Figure 1:
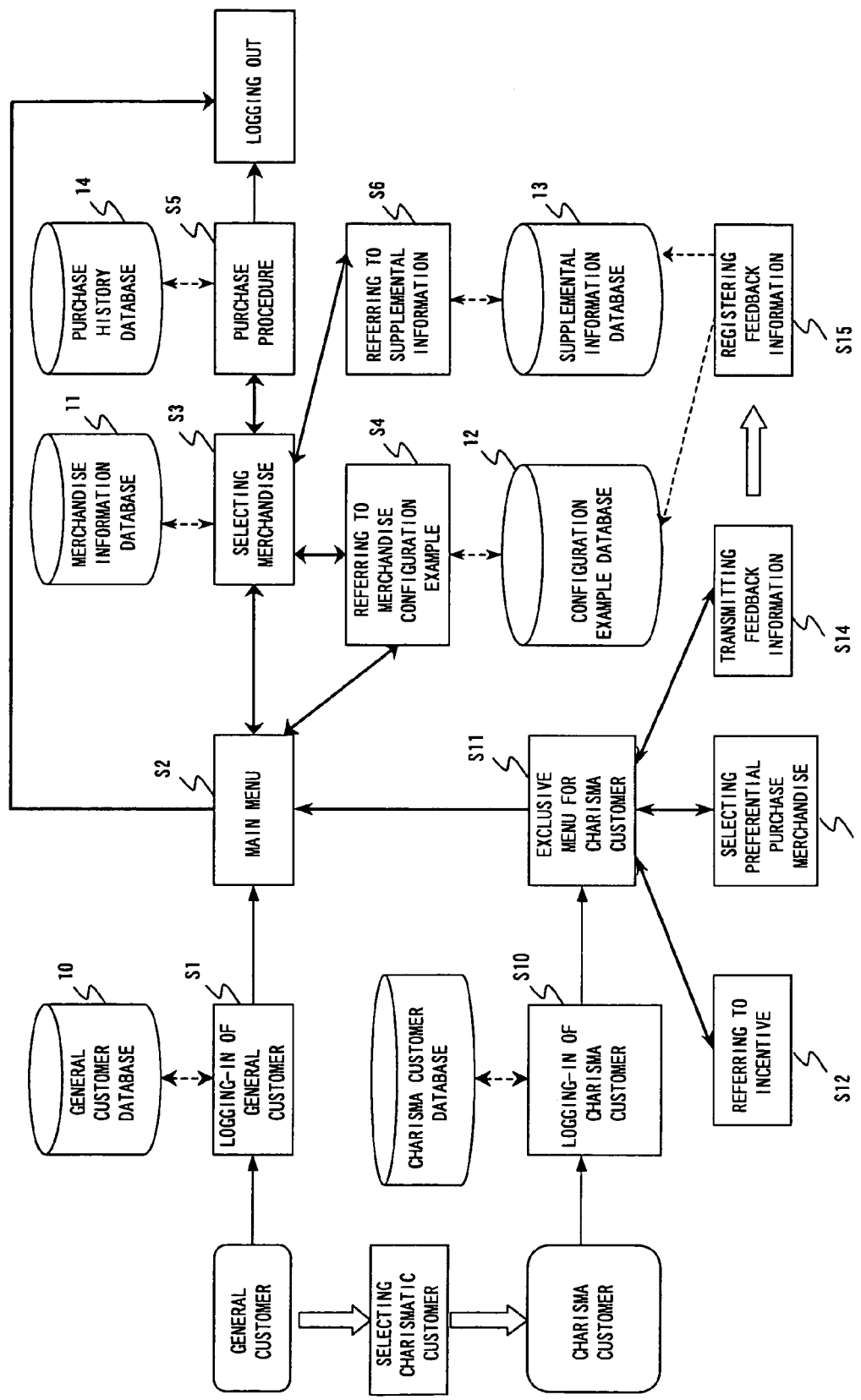
FIG. 1 is a flowchart showing the entire process of the system in the mode for realizing the embodiment of the present invention.

This invention is to provide various types of purchase support at the time of purchase via a network such as the Internet and the World Wide Web.

A store selects particular customers from among general customers as leader customers (hereinafter called charisma customers) based upon the standards which have been set in advance and according to purposes, by judging the degree of their knowledge about merchandise and the degree of influence which their opinions have upon other general customers. Other general customers are able to purchase the merchandise they want to purchase by referring to such supplemental merchandise information as the configuration of the merchandise which the charisma customers have already selected, merits or problems which they have found after purchasing and precautions to be observed when selecting merchandise.

Charisma customers are given the right to try or purchase new merchandise in advance of general customers or have the advantage of receiving an incentive such as a discounted merchandise price if necessary. However, they have the obligation of providing feedback information, problems and precautions that they have found concerning the merchandise after purchasing to the party selling in return for the right.

The charisma customers who purchase merchandise in advance of general customers provide feedback to the store information concerning the merchandise they have become aware of after they purchased it as well as supplemental merchandise information such as the points they took into consideration when they selected the merchandise. The store has a mechanism to manage that information and provide it to general customers as needed. Thus, general customers are able to learn of the compatibility between products and examples of combinations of products which they did not know about, by referring to the supplemental merchandise information in addition to general merchandise information, and are able to include these pieces of information in their judgement when they purchase merchandise.

In order to execute this properly, the system in the mode for realizing the invention has a mechanism to manage charisma customers, data, supplemental merchandise information fed back from charisma customers and a mechanism to manage said information in addition to the data for management of general customers and the mechanism and data required for merchandise information, sales and settlement of payment.

The system in the mode for realizing the invention is equipped with a series of operational steps executed in the central processing center which works together with a communication device installed at a customer's home. The following are included in these steps.

(1) Step for a charisma customer selected in advance from among general customers to log in using an identification symbol to the central processing center of a store via a communication network.

(2) Step for presenting the charisma customer with an incentive such as a preferential sale, trial use or discount sale of new merchandise.

(3) Step for the charisma customer to feedback to the store information such as the points he took into consideration when he purchased merchandise or the problems that occurred after the merchandise was purchased.

(4) Step for the store to evaluate the usefulness of the information provided from the charisma customer to the store and to add incentive points to the charisma customer account according to its evaluation of the degree of usefulness.

(5) Step for processing the information provided from the charisma customer to the store, as needed, and accumulating and managing it at the central processing center.

(6) Step for a general customer to log in, using an identification symbol, to the central processing center of the store via a communication network.

(7) Step for presenting the general customer with information such as merchandise configuration and precautions to be observed at the time of merchandise selection, when the customer selects the merchandise he wants to purchase from a list of merchandise, in order to help him with his merchandise selection.

(8) Step for executing a selling procedure of the merchandise that the general customer has selected.

FIG. 1 is a flowchart showing the entire process of the system in the mode for carrying out this invention.

In the mode for carrying out this invention, a general customer logs in to the central processing center (S1) via a network such as the Internet that connects said customer and the merchandise selling system. After he logs in, he inspects, selects and purchases merchandise by moving freely among the sub-menus, including the merchandise selection sub-menu for selecting the merchandise he wants to purchase, the merchandise configuration example reference sub-menu for referring to merchandise combination examples and the purchase procedure sub-menu for determining his actual purchase (S2, S3, S4, S5, S6) by using the main menu as a go-between.

At that time the customer can refer to various kinds of information, as needed, which is stored in the general customer information database 10 to manage customer information, in the merchandise information database 11 to manage information concerning merchandise, in the configuration example database 12, and in the supplemental information database 13. The record of the merchandise he has purchased is stored in the purchase history database 14.

In the mode for realizing this invention the system has a process for processing the information concerning charisma customers selected from among general customers, in addition to a conventional system. Charisma customers are managed independently of general customers, and they freely move, after completing an exclusive log-in process (S10), among the sub-menus such as by referring to an incentive (S12), selecting preferential purchase merchandise (S13), transmitting feedback information (S14) by using a charisma customer menu (S11) as a go-between; they transmit the information they took into consideration when purchasing merchandise, merchandise configuration and problems that occurred after purchasing it, to the system as feedback information (S15); then the merchandise information stored in a configuration example database 12 and a supplemental information database 13 is updated based upon that new information.

General customers can receive support for selecting merchandise by referring to the information provided by charisma customers when selecting merchandise. The charisma customers can receive an incentive from the store in accordance with the degree of usefulness of the information they provide. This incentive includes the presentation of incentive points that can be used as discount points for a subsequent purchase at a later date as well as the right to purchase merchandise before general customers or to purchase it at a discounted price. The charisma customers can also receive the same service as that general customers receive in merchandise selection, purchase procedure or reference to information on merchandise by shifting from the exclusive menu for charisma customers (S11) to the main menu for general customers (S2).

In conventional systems, a store used to make configuration examples of merchandise and merchandise information in advance and provide it to customers. In this method it costs a great amount for the store to make the information. In the mode for realizing this invention, however, it is possible to reduce the cost by selecting charisma customers from among general customers and registering merchandise configuration information and supplemental information using the information fed back from the charisma customers to the store.

Figure 2:
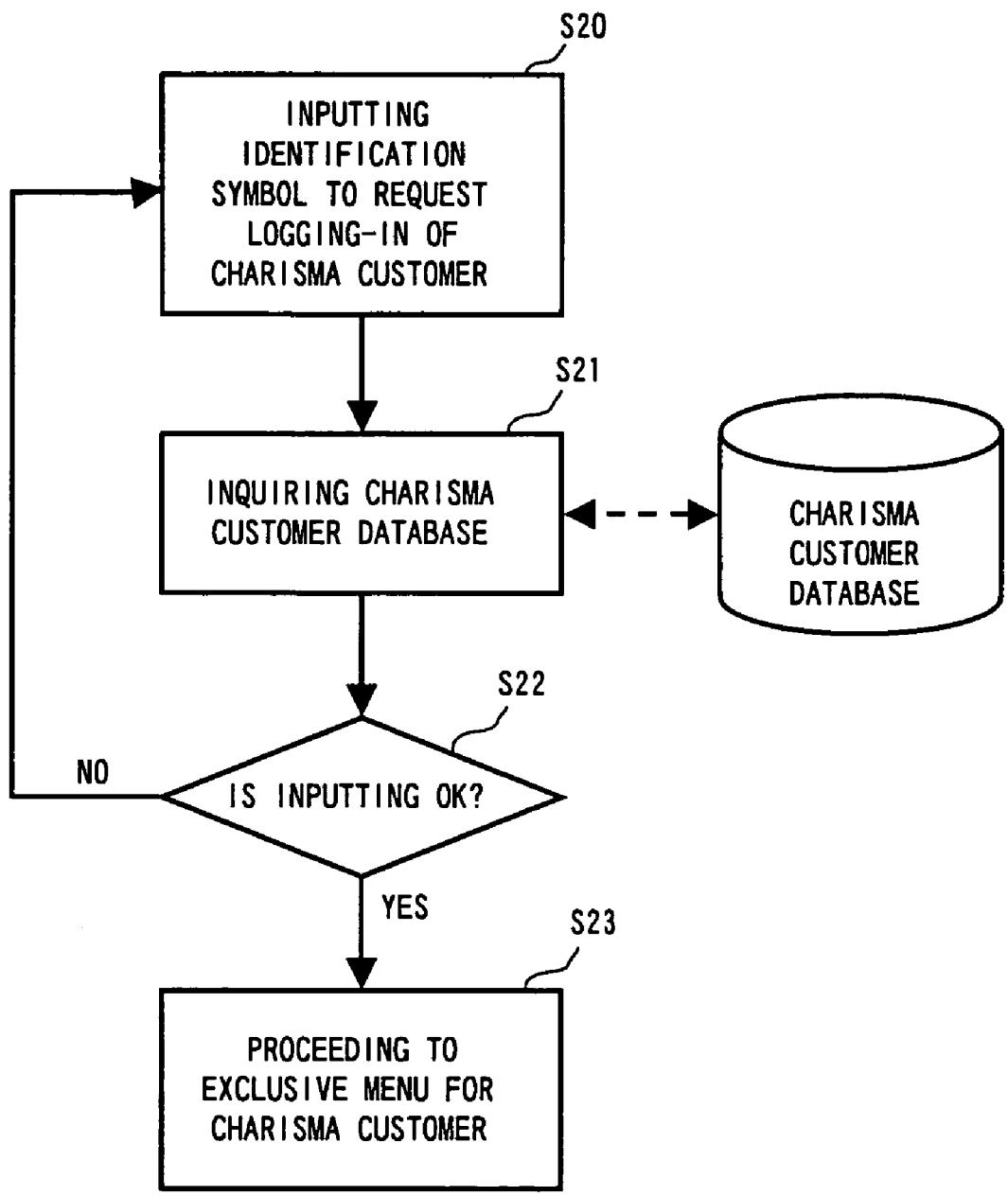
FIG. 2 is a flowchart showing the process in which a charisma customer selected in advance from among a number of customers logs in using an identification symbol to the central processing center of a store via a communication network.

FIG. 2 is a flowchart showing the process in which the charisma customers selected in advance from among general customers login, using an identification symbol, to the central processing center of the store via a communication network.

The charisma customers input an identification symbol (ID) and a password, both of which are given to them in advance, and request the central processing center to log them in, and then connect to the system in the mode for realizing the invention (Step S20). At that time the system refers to customer information stored in the charisma customer database (Step S21) and confirms the validity of the log in request (Step S22). If the request is valid, it proceeds to the exclusive menu for charisma customers (Step S23). If the request is invalid in Step 22, it repeats the process by starting from the log in step again.

FIG. 3 is a flowchart showing the process of providing the charisma customers with an incentive such as a preferential sale, trial use or discount sale of new merchandise. In the mode for realizing the invention, presentation of effective feedback information from charisma customers is required. For that sake it is important to conduct the matching of the merchandise in the field that the charisma customer is good at with the merchandise attribute in accordance with the customer attribute and his purchase history and then determine which merchandise should be sold and which charisma customers it should be sold to before general customers. Shown here is the process of presenting merchandise on a preferential basis to the charisma customers who are likely to feed more useful information back to the store when they inquire about the merchandise that can be purchased on a preferential basis, by conducting the matching of information with the customer information stored in the charisma customer database, the merchandise information stored in the merchandise information database and the purchase history information. It is also possible to reflect the store's preference, when conducting the matching of customer attribute and merchandise attribute, on the merchandise and the customers that the store thinks particularly important.

The charisma customers can select the merchandise they want to purchase from among the merchandise that can be purchased on a preferential basis. At that time, it is important to bear in mind that information as to which customer has selected which piece of merchandise is registered in the charisma customer database, and when the store receives feedback information later, the store should be careful not to misjudge said charisma customers as those who have not provided feedback information yet and it should be careful not to let the same charisma customer purchase the same merchandise repeatedly on a preferential basis.

In addition, it is important to give merit to charisma customers, to whom merchandise is provided on a preferential basis, so that they may provide more useful feedback information to the store. They can receive incentive points in accordance with the usefulness of the information they provide. They can also check, if necessary, how many points they have at present. It is by discounting the merchandise purchasable on a preferential basis in accordance with the incentive points that the charisma customers can gain preference in purchasing the next piece of merchandise at a lower price on a preferential basis if they provide useful feedback information to the store.

Described below is the flowchart of FIG. 3. First, a charisma customer accesses the system and opens the exclusive menu for charisma customers. Then he selects either the incentive reference menu or the preferentially purchasable merchandise introduction menu from the exclusive menu for charisma customers. If he selects the incentive reference menu in Step S31, he inquires about his incentive points in Step S32. The system displays the number of incentive points on his terminal in Step S33 in response to the inquiry. Thus, he can confirm the number of incentive points he has. When the display of incentive points terminates, the system goes back to step S30.

When the charisma customer selects the preferentially purchasable merchandise introduction menu from the menu displayed in Step S30, the system conducts the matching of the customer attribute and merchandise attribute in Step S35. At that time the store can increase its promotion. The matching is conducted in Step S35 with reference to the merchandise information database, the purchase history database and the charisma customer database.

As a result of said matching, candidates of the preferentially purchasable merchandise are displayed in Step S36. The charisma customer selects the preferentially purchasable merchandise in Step S37. The result of a selection made in Step S37 is stored in the charisma customer database. When the selection terminates, the system goes back to Step S30.

Figure 4:
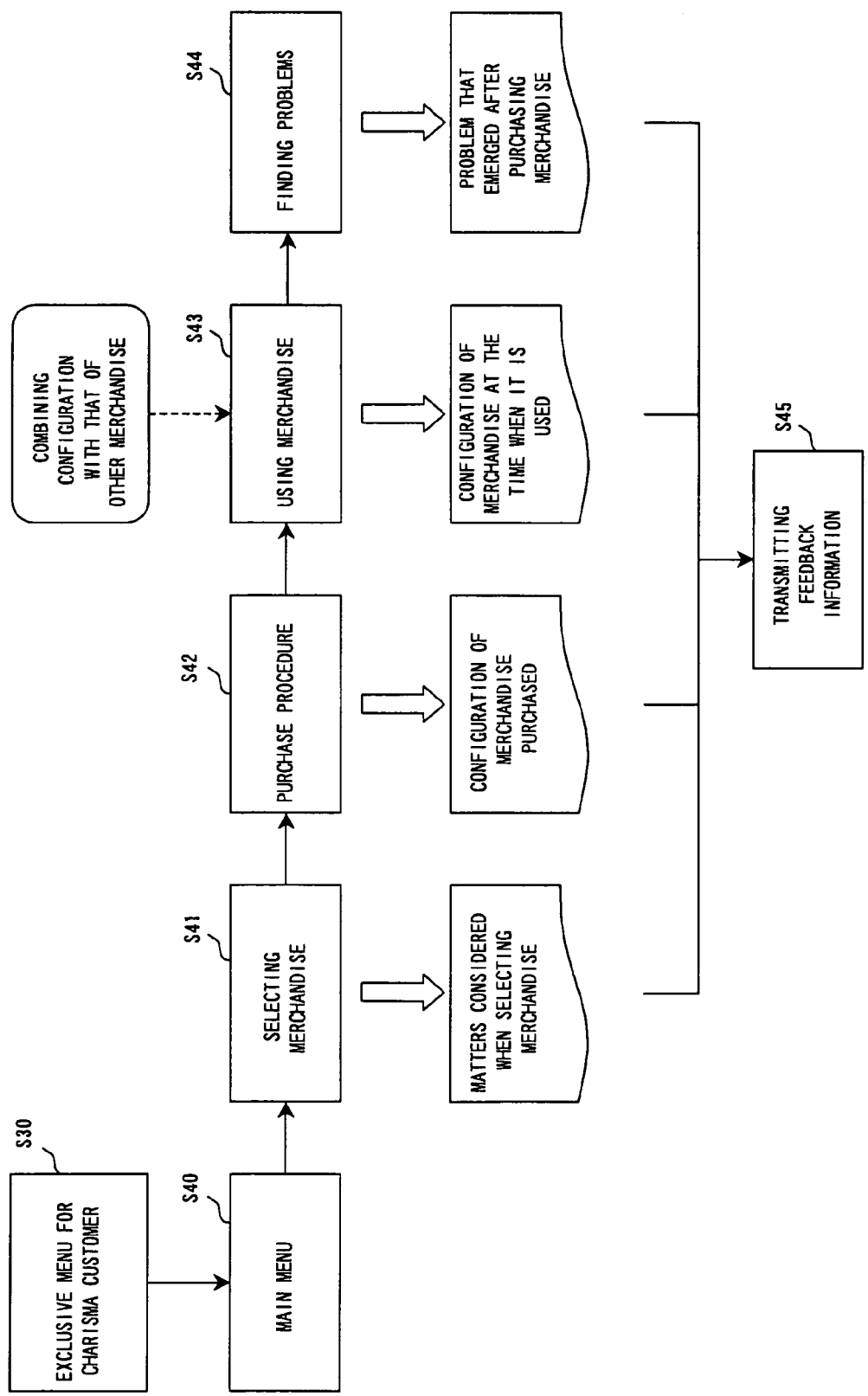
FIG. 4 is a flowchart showing the process of feeding back to the store the points that the charisma customer took into consideration when purchasing the merchandise or problems that emerged after it was purchased.

FIG. 4 is a flowchart showing the process of feeding back to the store the information that the charisma customer took into consideration when purchasing the merchandise or the problems that emerged after he purchased it.

The charisma customer transmits to the store feedback information as to why he selected the merchandise, the factors he took into consideration when purchasing the merchandise, such as merits and demerits determined in comparison with other merchandise, factors related to the merchandise configuration such as the kind of merchandise combination for which he purchased the merchandise, factors related to the merchandise configuration at the time of use, such as the kind of other merchandise that he already owns and has combined with the purchased merchandise when he actually used it, and factors related to the problems that occurred after he purchased it or related to defects that occurred due to the merchandise being combined with other merchandise.

Described below is a flowchart of FIG. 4. The charisma customer proceeds from the exclusive menu for charisma customers in Step S30 to the main menu in Step S40, and selects merchandise in Step S41. Then he takes a necessary purchase procedure in Step S42 and obtains the merchandise in Step S43, and he uses the merchandise, for example, by combining it with other merchandise. If any problem occurs in Step S44, the kind of problem that occurs is examined. After a series of these steps the system transmits the factors he took into consideration when selecting the merchandise, the configuration of the merchandise he purchased, the merchandise configuration applied when he used the merchandise, and the problems that occurred after he purchased it, to the central processing center as feedback information in Step S45.

Figure 5:
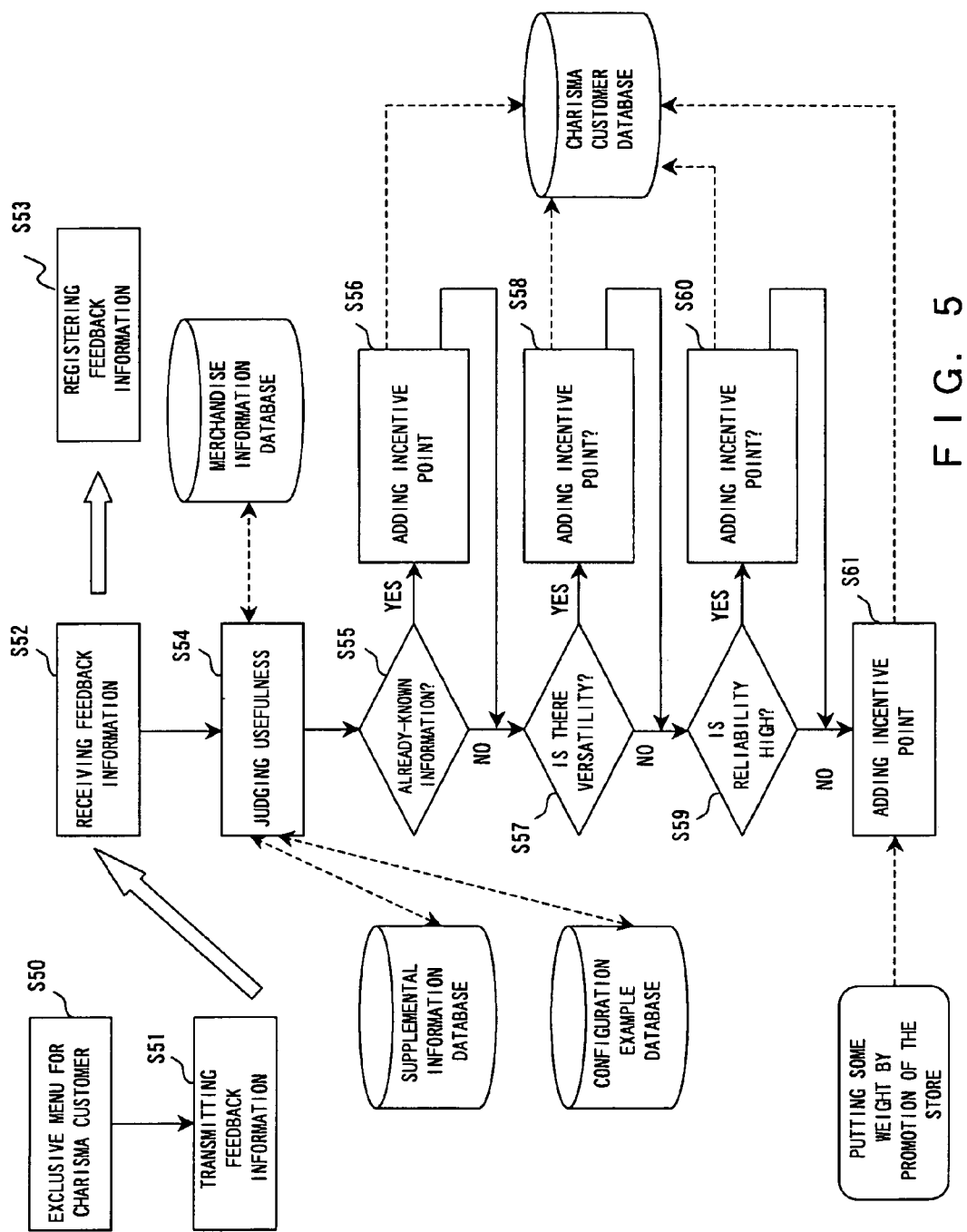
FIG. 5 is a flowchart showing the process in which the store evaluates the usefulness of the information with which the charisma customer provided the store and gives the charisma customer an incentive point added in accordance with the evaluation.

FIG. 5 is the flowchart showing the process in which the store evaluates the usefulness of the information the charisma customer provided the store and gives the charisma customer incentive points in accordance with the degree of the usefulness.

In the mode for realizing the invention it is important to evaluate the usefulness of the feedback information provided by the charisma customer and give him an incentive in accordance with the degree of the usefulness. The charisma customer opens the exclusive menu for charisma customers in Step S50, and after completing the above-mentioned steps, he transmits the feedback information to the store in Step S51. The store receives the feedback information transmitted from the charisma customer in Step S52, registers the feedback information in Step S53, and judges the usefulness of the said information in Step S54.

At that time the store evaluates the usefulness of the feedback information by referring to the information stored in the supplemental information database, the configuration example database and the merchandise information database, and then the store evaluates it on such judgement standards as: whether the information is already known (Step S55), whether there is any general versatility applicable to other merchandise (Step S57), whether the reliability is high and is free from contradiction with other various pieces of information (Step S59). Then, it adds incentive points to the charisma customer who provided the information in accordance with the usefulness of the information (Steps S56, S58 and S60). At that time the store can also give a greater number of incentive points to the charisma customer who transmits his feedback information about the merchandise that the store has registered as the one provided to the said charisma customer on a preferential basis.

Also, the store can increase the number of incentive points as required if a charisma customer provides information that it considers to be very important (Step S61). The incentive points are stored in the charisma customer database.

FIG. 6 is the flowchart showing the process of judging the general versatility of the supplemental information and configuration information of the merchandise that the charisma customer fed back to the store.

First, the store obtains the classification hierarchy to which the merchandise belongs from the merchandise database in Step S65. Next, it judges whether the provided information can be applied to other merchandise in the same category in Step S66. Then it judges whether the provided information can be applied to other categories included in the upper category in Step S67, and also judges whether the field which the charisma customer is good at widely contains said category, and finally marks the general versatility in terms of points.

In a series of these proceedings it is desirable for a human being to participate in the system operation and judge and mark the general versatility of the information that cannot be obtained by the judgement of the classification hierarchy described above. In other words, it is possible to automatically execute all the steps described above by means of a program, but in the evaluation of the ambiguous standards of general versatility, it is difficult to construct an algorithm of the judgement standards, so that it is not necessarily possible to make a correct evaluation of the ambiguous terms of general versatility if it is done by way of a fully-automated operation. It is better, therefore, to perform these steps by way of a semi-automatic operation or for a human being to perform all these steps in order to reflect the needs of customers.

FIG. 7 is a flowchart showing the process of judging the reliability of the supplemental information and configuration information of the merchandise that the charisma customer fed back to the store. The store judges the reliability of the charisma customer from the record of the information he provided in the past in Step S70, totals the information that other charisma customers have provided concerning the same merchandise, judges the conformability with the majority opinions, and judges the conformability with the existing supplemental information and configuration information of the merchandise in the same or related category in Step S72.

In this procedure too, the system has to judge the ambiguous standards of general versatility as in FIG. 6, so it is not necessary to perform all the steps by way of a fully-automated operation, but instead it is desirable to perform the steps byway of a semi-automated operation or to perform all the steps using the judgement of a human being. Thus, subtle judgements that cannot be obtained from automatic-operation judgement becomes possible, and it also becomes possible to judge more accurately the reliability of the information from the charisma customer.

Figure 8:
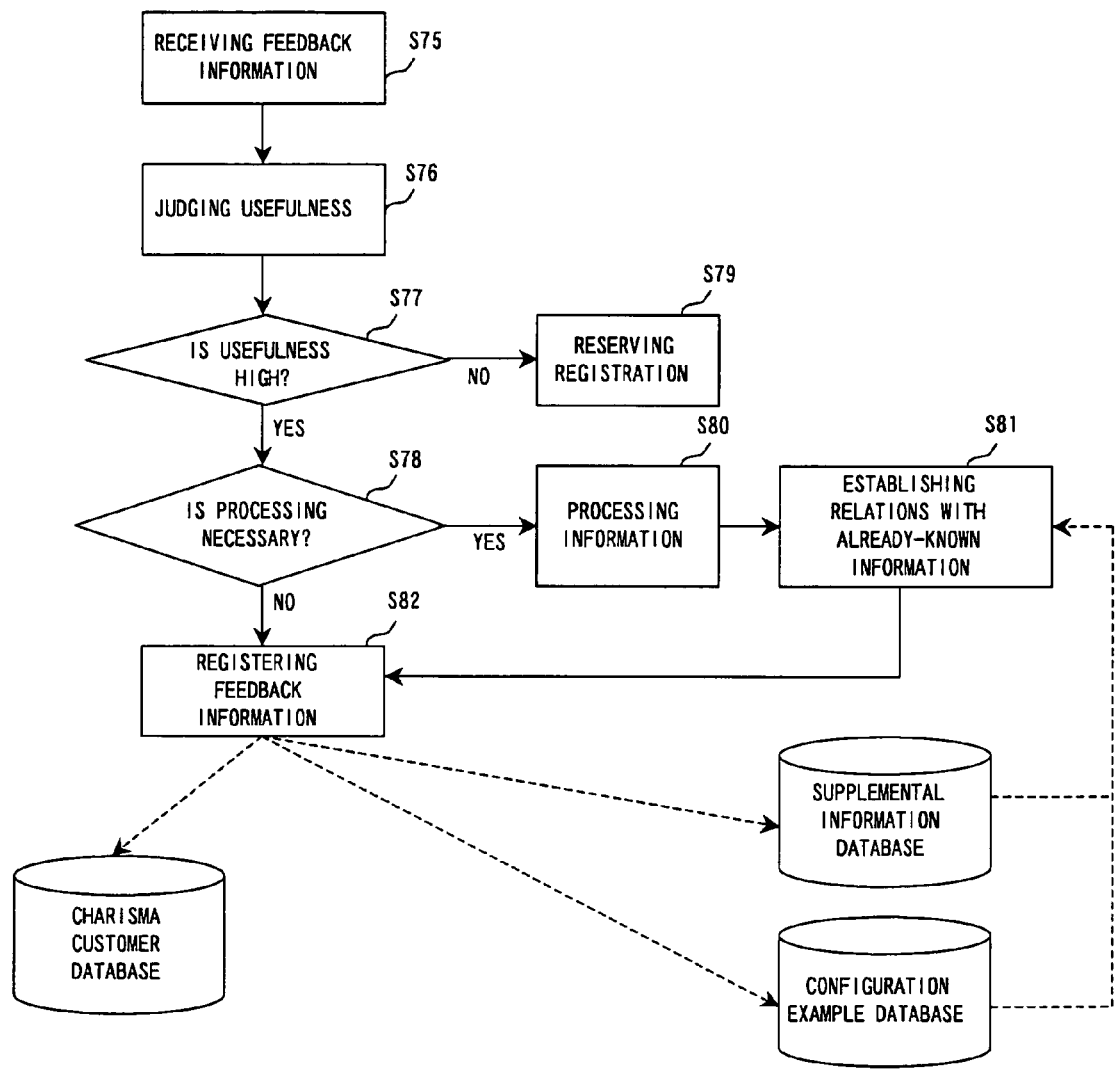
FIG. 8 is a flowchart showing the process of, if necessary, processing the information with which the charisma customer provided the store and of accumulating and managing it at the central processing center.

The result of judgement obtained in this way is marked in points in Step S73. FIG. 8 is a flowchart showing the process of, if necessary, processing the information the charisma customer provided the store and of accumulating and managing it at the central processing center.

In the mode for realizing the invention it is important to judge the usefulness of the information fed back from the charisma customer and to register it, as needed, in the supplemental information database and the configuration example database without any contradiction. At that time, the store should delay registering less useful information and register the information after establishing links with existing information as needed.

By inputting the end of the feedback information registration into the charisma customer database, it becomes possible to judge the charisma customers who have not transmitted any feedback information yet.

Described below is the flowchart of FIG. 8. First, the store receives feedback information in Step S75 and judges the usefulness of the feedback information in Step S76. Then, it judges whether the usefulness is high in Step S77. If the usefulness of the feedback information is judged to be low, it proceeds to Step S79 and delays registering it. If the usefulness of the feedback information is judged to be high, it proceeds to Step S78 and judges whether processing of the information is necessary. If processing is judged to be necessary, it proceeds to Step S80, processes the information, establishes links with already-known information in Step S81, and registers the feedback information in Step S82. If processing of the feedback information is judged to be unnecessary in Step S78, it proceeds to Step S82 and registers the feedback information. The feedback information is registered in the charisma customer database, the supplemental information database and the configuration example database. In Step S81 the already-known information that has been registered in this way is read from these databases and is used to process the fed-back information.

In the procedures of FIG. 8, it is effective for a human being to intervene between the steps and judge the usefulness of the feedback information. Usefulness is ambiguous as a judgement standard. While rough judgement is possible by way of an automated operation, it is difficult to construct an algorithm of fine judgements. So, if a human being judges the usefulness of the feedback information and determines whether said information should be registered, merchandise information that reflects the needs of customers can be provided.

Figure 9:
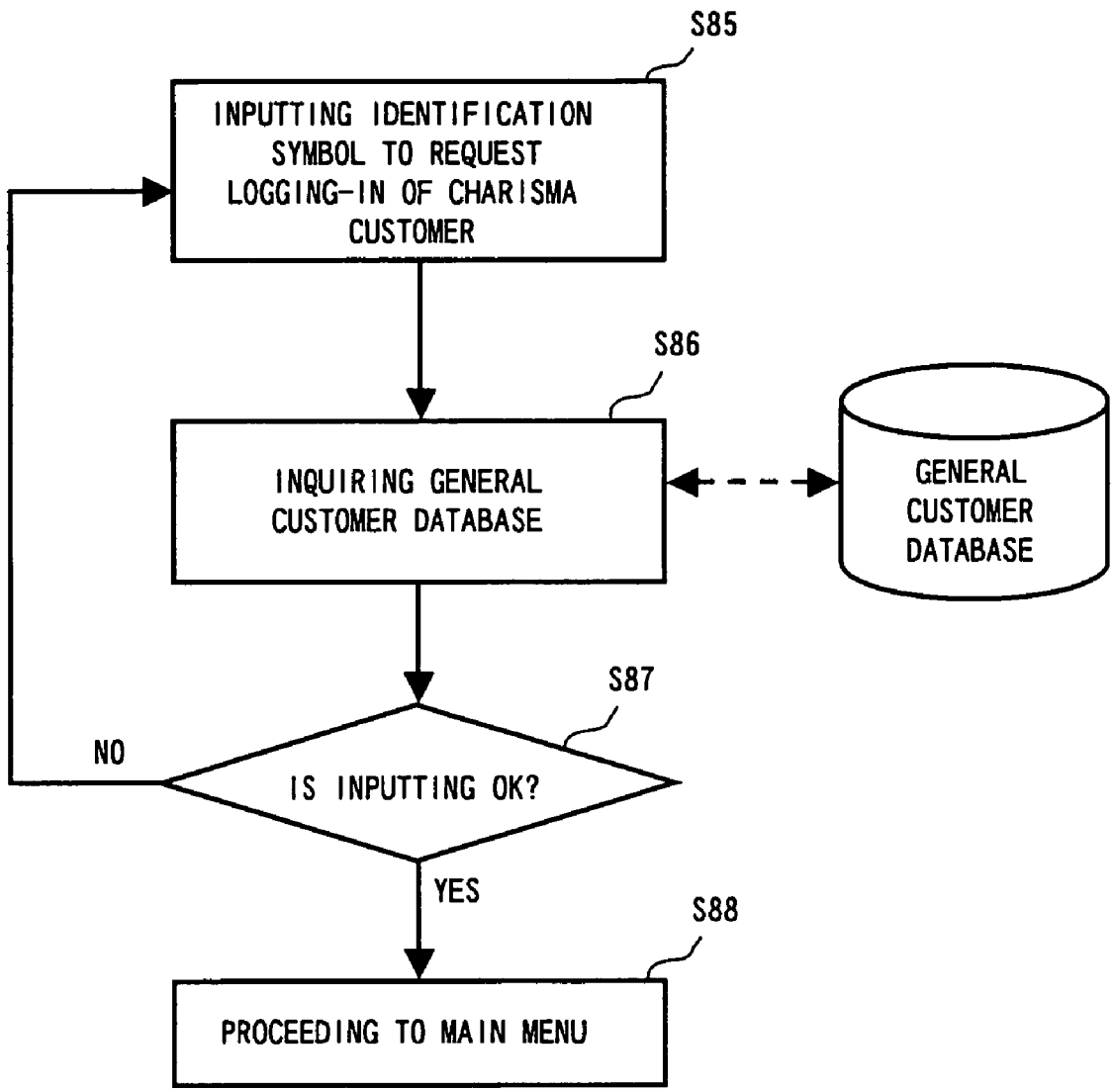
FIG. 9 is a flowchart showing the process in which a general customer logs in using an identification symbol to the central processing center of a store via a communication network.

FIG. 9 is the flowchart showing the process in which a general customer logs in, using an identification symbol, to the central processing center of the store via a communication network. The general customer can connect to the system by inputting an identification symbol (ID) and password which have been given to him in advance and requesting logging in (Step S85). At that time the system refers to the customer information stored in the general customer database (Step S86) and confirms the validity of the log in request (Step S87). If the request is valid, it proceeds to the main menu for general customers (Step S88). If the request is judged to be invalid in Step S87, it goes back to Step S85.

Figure 10:
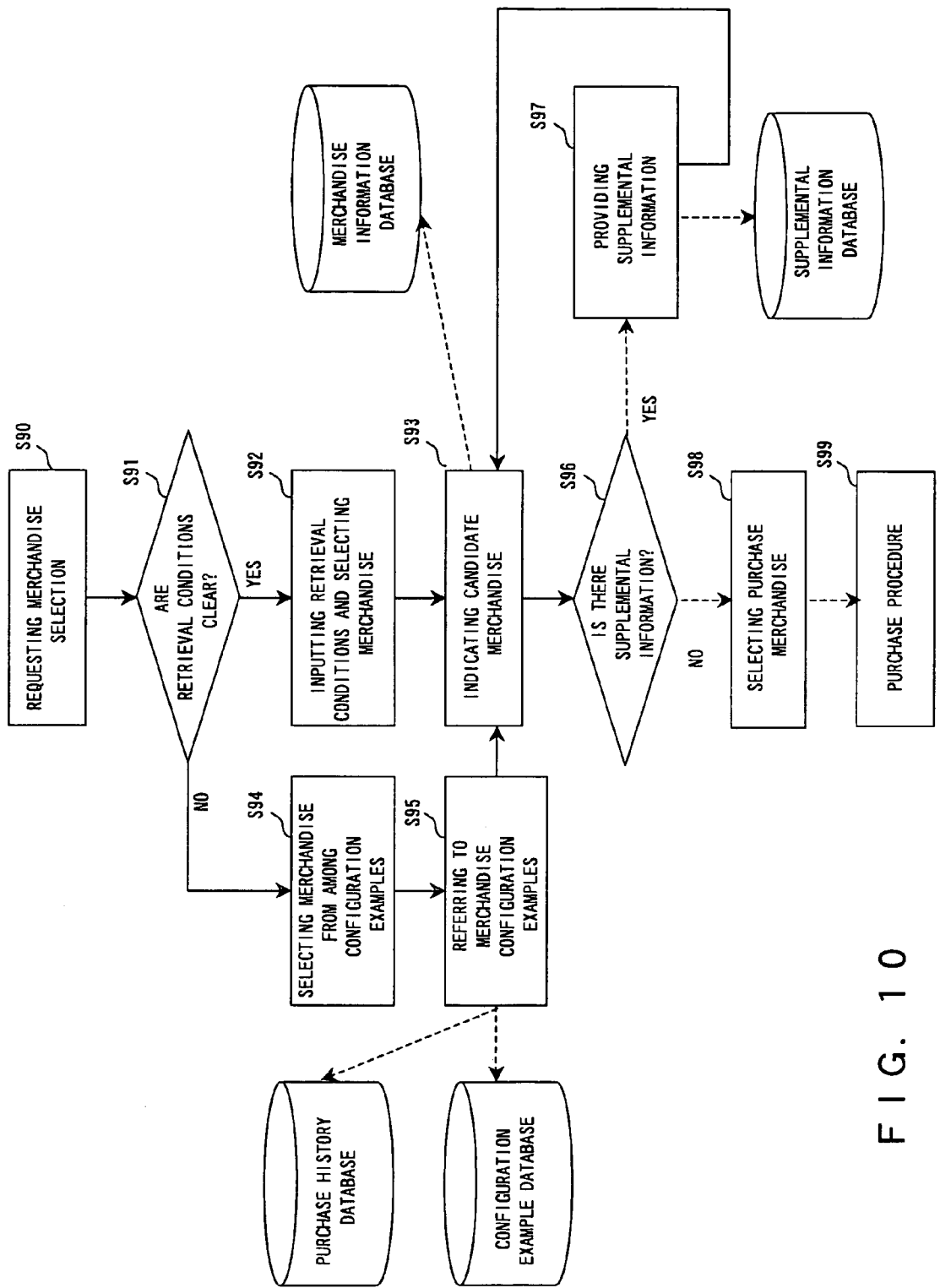
FIG. 10 is a flowchart showing the process of providing a general customer with the information on the configuration of the merchandise and precautions to be observed at the time of purchase to help the customer with his merchandise selection when he selects the merchandise he wants to purchase from a list of merchandise.

FIG. 10 is a flowchart showing the process of providing a general customer with information on the merchandise configuration and precautions to be observed at the time of purchase to help him with his merchandise selection when he selects the merchandise he wants to purchase from a list of merchandise.

In the mode for realizing the invention, in order to avoid the retrieval of complicated merchandise such as the kinds of a plurality of merchandise the general customer should combine when he purchases merchandise, the system judges whether the retrieval conditions are clear when the general customer requests selecting merchandise in Step S90. If the retrieval conditions are not clear, he can select merchandise from among merchandise configuration examples (Step S94). The general customer can refer to the configuration examples registered based upon the feedback information on the merchandise that charisma customers have purchased or used in combination with the merchandise they already possess (Step S95), indicate merchandise candidates he wants to purchase (Step S93), and select a configuration near to that he desires. He can also see the information about merchandise that he has already purchased in the purchase history database as well as the configuration examples including said merchandise.

When the retrieval conditions for the merchandise that the general customer wants to purchase are judged to be clear in Step S91, he can input the retrieval conditions and select the merchandise in Step S92. The retrieval conditions therein required are a mixture of merchandise classification, function, price, manufacture, type and so forth. The merchandise that complies with the retrieval conditions or the one included in the configuration examples referred to are shown to general customers as merchandise candidates (Step S93).

The general customer selects and determines the merchandise he wants to purchase from the merchandise candidate (Step S98). At that time the selling system provides the information concerning the merchandise from the merchandise database. When it provides the merchandise information, it provides supplemental information as well if there is any supplemental information about the merchandise (Steps S96 and S97). This supplemental information is registered based upon the feedback information such as the factors that charisma customers took into consideration when selecting their merchandise and the problems that occurred when they used the merchandise. The general customer has such a benefit that he can refer to the supplemental information when selecting the merchandise he wants to purchase so that he can learn in advance of the problems that may occur after purchasing it or the requirements for it to be in combination with other merchandise. On the other hand, the benefit to the store is that while the store itself had to prepare all these pieces of information in the past, which was tremendously costly, it is able not only to reduce the cost, but also to provide general customers with information in advance about the problems that may occur with the merchandise in the future, thus preventing problems from occurring in the future.

When the general customer refers to the supplemental information, the system records the frequency at which the supplemental information was referred to, in the supplemental information database. This can be one of the indexes used to evaluate the usefulness of the information.

The general customer, referring to the supplemental information concerning merchandise, obtains information required for selecting merchandise and selects the merchandise he wants to purchase, and then proceeds to the purchase procedure (Step S99).

FIG. 11 is a flowchart showing the process of executing the procedure for selling the merchandise that a general customer selects as the one he wants to purchase.

The general customer purchases the merchandise after completing the above-mentioned processes related to merchandise selection. In the mode for realizing the invention it is important to identify the customer that has made a purchase and the merchandise he purchased. For this purpose the system stores information about the merchandise he purchased in the purchase history database after the procedure for payment is executed. This purchase history database can be used to determine merchandise candidates for purchase when he selects the next piece of merchandise to be used in combination with other merchandise. Also, the fact that the general customer has purchased the merchandise after referring to the supplemental information and configuration examples is recorded so that it can be the index for evaluating the usefulness of the information that charisma customers have fed back.

Described below is a flowchart of FIG. 11. The general customer accesses the main menu in Step S100 and selects merchandise in Step S101. In Step S102 he performs the procedure for payment. The system registers his purchase history in the purchase history database in Step S103. Then, it judges whether his purchase is finished. If his purchase has not been finished, it goes back to Step S100 and repeats the process. When the general customer makes an input indicating he has finished his purchase in Step S105, he logs out from the system in Step 105.

FIG. 12 is a schematic diagram showing a configuration example of a merchandise configuration management database to provide information about the merchandise configuration and precautions to be observed at the time of purchase, thus helping the customer select the merchandise he wants to purchase.

Customer attributes such as customer name, address, sex, age, hobby and interests are registered in the general customer database in correspondence with the customer's ID. These customer attributes are used not only as general information to manage customers but also to select candidates of the merchandise suitable for the general customer by matching them with the merchandise information when he selects the merchandise he wants to purchase. In this case, reference to the purchase history database (pointer) that records the kind of merchandise he has purchased up to that point in time is included. Registered in the purchase history database in correspondence with the customer's ID are the customer ID, merchandise ID, quantity, merchandise purchased simultaneously, supplemental information, configuration examples (such as an example of a merchandise combination), and date and time of purchase.

Included in the charisma customer database is information about which field of merchandise the charisma customer has knowledge, the present state of incentive points, information concerning the merchandise he purchased on a preferential basis, a reference (pointer) to the information he fed back, in addition to the information included in the general customer database. When the store gives an incentive to the charisma customer, it determines whether it provides the merchandise to him on a preferential basis by referring to the customer's age, occupation, characteristics, hobby and ability data stored in this charisma customer database, and gives him an incentive to purchase particular merchandise on a preferential basis.

Included in the merchandise information database is the attribute of each individual piece of merchandise as general management information of merchandise. In addition to that, included are a reference (pointer) to supplemental information concerning the merchandise, reference (pointer) to the charisma customer who has knowledge about the merchandise, and the date and time when the information is registered.

Registered in the purchase history database is information about which customer made a purchase, which piece of merchandise he purchased and when he purchased it. Also included therein are reference (pointer) to other merchandise he simultaneously purchased, and supplemental information and configuration examples provided to him when he made the purchase.

Included in the supplemental information database are factors taken into consideration at the time of purchase concerning each individual piece of merchandise, information for simultaneous purchase, information on the configuration in combination with other merchandise, merchandise information such as problems encountered after the merchandise was used, information showing what customer attribute the merchandise is suitable for, the date and time when the information was registered, the frequency in which the supplemental information was referred to and the degree of usefulness of the information.

Included in the configuration example database are combination examples where some pieces of merchandise are combined to make a product. Also included therein are charisma customers who fed back the combination configuration, the merchandise included in said configuration, information including what customer attribute the merchandise is suitable for, references (pointer) to supplemental information concerning the said configuration, the merchandise that cannot be used in that combination configuration, the date and time when the information was registered, the frequency at which the supplemental information was referred to, the frequency at which general customers purchased the configuration, and the degree of usefulness of the information.

Figure 13:
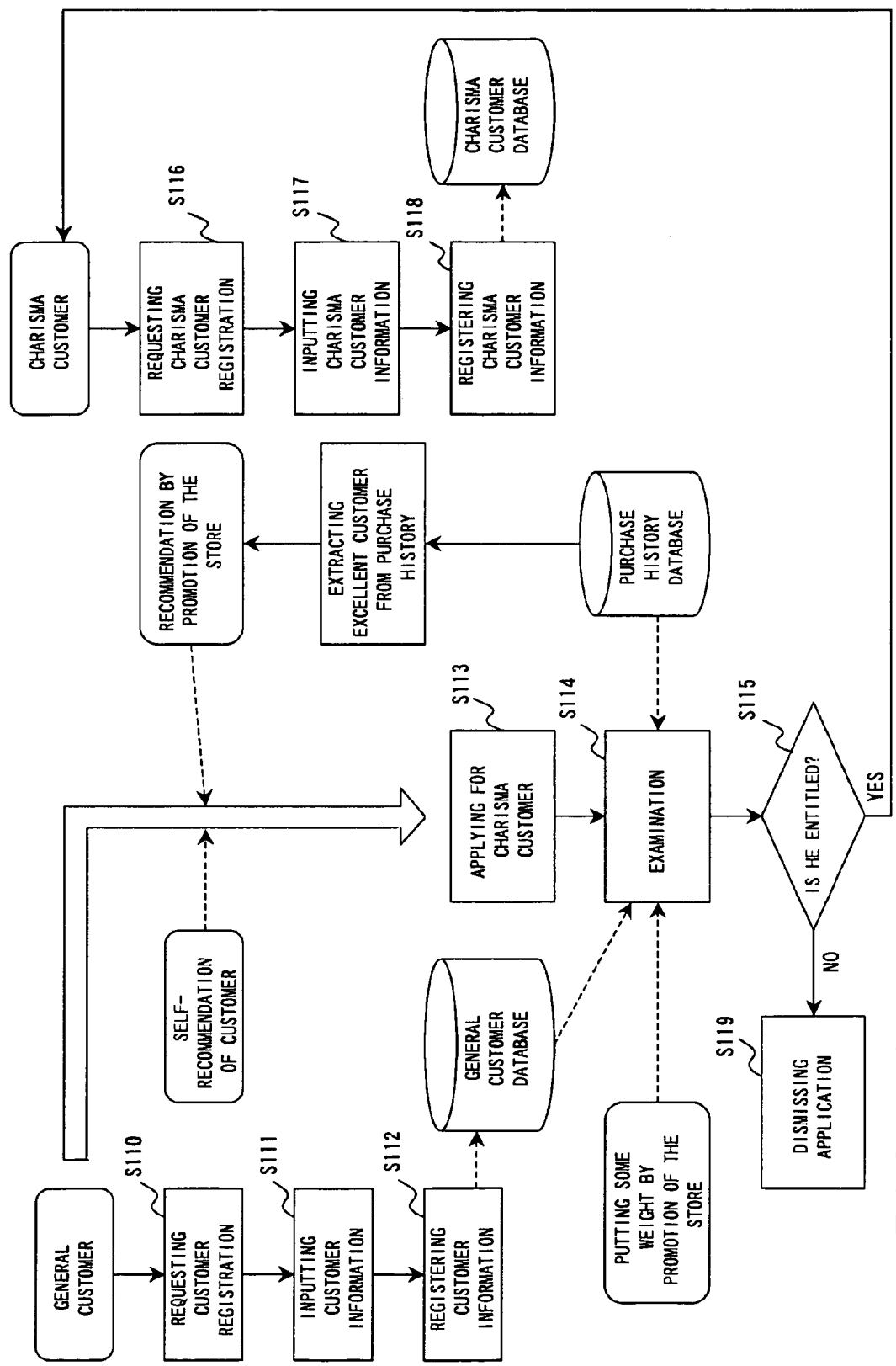
FIG. 13 is a flowchart showing the process of selecting charisma customers from among general customers in the mode of realizing the embodiment of the present invention.

FIG. 13 is a flowchart showing the process of selecting charisma customers from among general customers in the mode of realizing the invention. In the mode for carrying out the invention it is important to select as charisma customers the customers who will provide useful merchandise information from among general customers.

When a general customer uses the system in the mode for realizing the invention for the first time, he has to request customer registration and input customer information such as the customer's attribute. The inputted customer information is registered in the general customer database.

In practice, the general customer requests customer registration in Step S110 and inputs customer information in Step S111. Then, the customer information is registered in the general customer database in Step S112.

The general customer can apply to be a charisma customer by way of self-recommendation so that he can be registered as a charisma customer (Step S113). In addition to the general customer's self-recommendation, the store can extract excellent customers from information registered in the purchase history database and recommend that they be charisma customers. The system examines the application received (Step S114). At that time the system not only checks the customer information registered in the general customer database, but also judges whether the customer is entitled to be registered as a charisma customer from his past purchase history and the preference of the store. This judgement can be made automatically by executing a program that uses a particular algorithm. However, if a human being analyzes data and forms a judgement, that makes a finer examination possible. In fact, when it is automatically judged whether a particular customer is entitled to be a charisma customer, it is imperative to construct an algorithm of the judgement standards for a human being to evaluate a human being, and such a judgement cannot be easily replaced by numeric values, so it is difficult to build an adequate algorithm. Therefore, it is desirable for a human being to explicitly intervene in this operation and compensated for said weakness so as to make a more appropriate analysis.

As a result of the judgement, if the customer is judged to be entitled to be a charisma customer, he requests charisma customer registration (Step S116) and inputs customer information peculiar to a charisma customer (Step S117). The inputted customer information is registered in the charisma customer database (Step S118). If the customer is judged to be not entitled to be a charisma customer in Step S115, the application is terminated (Step S119).

Figure 14:
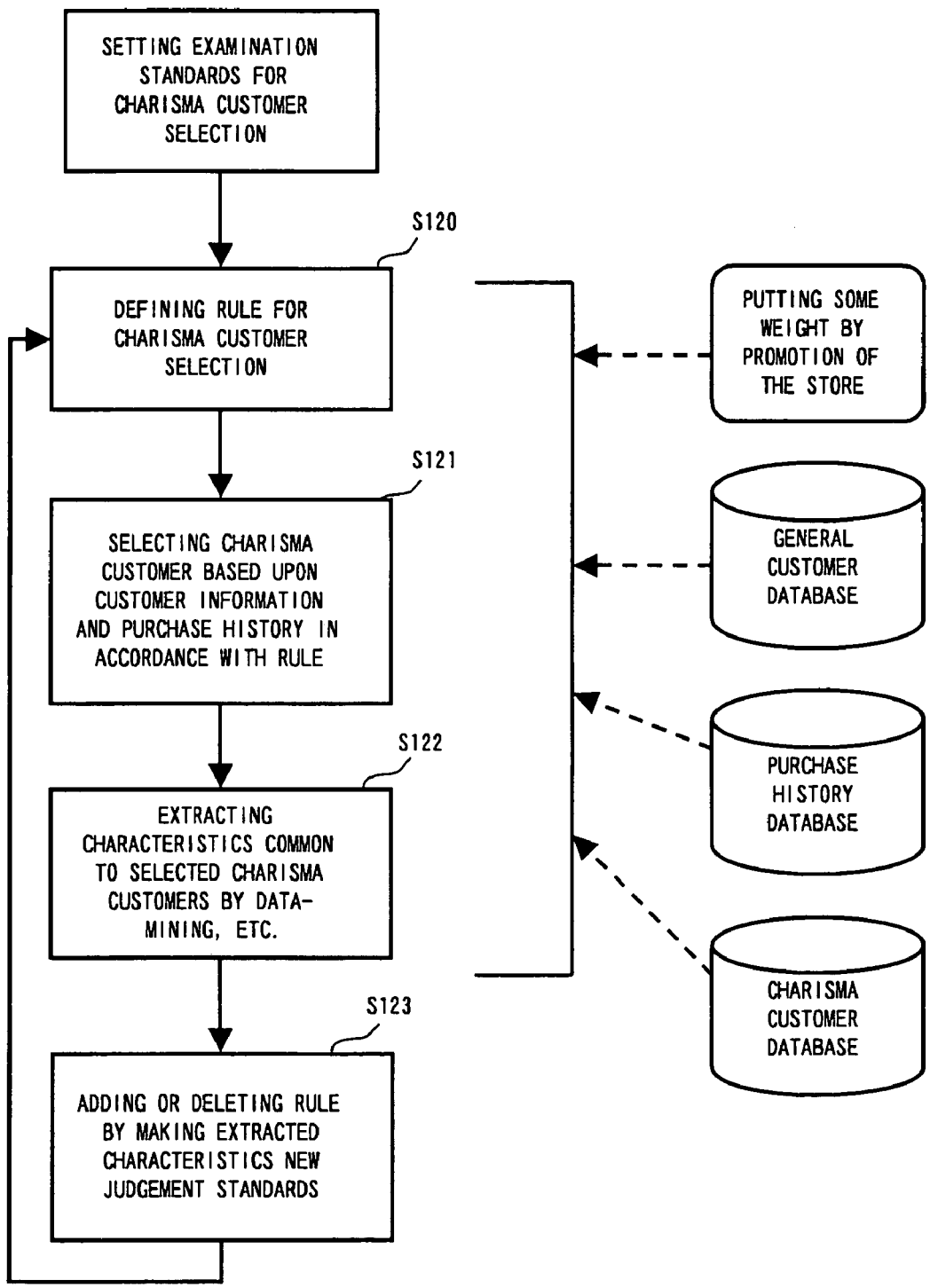
FIG. 14 is a flow chart showing the process of setting the standards of examination in the process of selecting charisma customers from among general customers.

FIG. 14 is a flowchart showing the process of setting the standards of examination in the process of selecting charisma customers from among general customers. First, a human being defines the rules for selecting a charisma customer in Step S120. Then he selects the charisma customers based upon the customer information and the purchase history in accordance with said rule in Step S121, extracts the characteristics common to the selected charisma customers by data mining in Step S122, and performs revision of the rule such as by addition, change or deletion using the extracted characteristics as new judgement standards in Step S123.

If this method is used, jobs to be performed by a human being in conjunction with the system can be decreased. That is, according to this process, a human being first determines the rules for selecting charisma customers, selects charisma customers based upon the basic rules, determines a new rule from the characteristics of the selected charisma customers, and gradually renews the optimum rules for automatically selecting charisma customers. When an optimum rule is judged to have finally been obtained, he constructs an algorithm of this rule as a program by which charisma customers can be automatically determined, thus enabling the human being to reduce his jobs to be done for the operation of the system.

Figure 15:
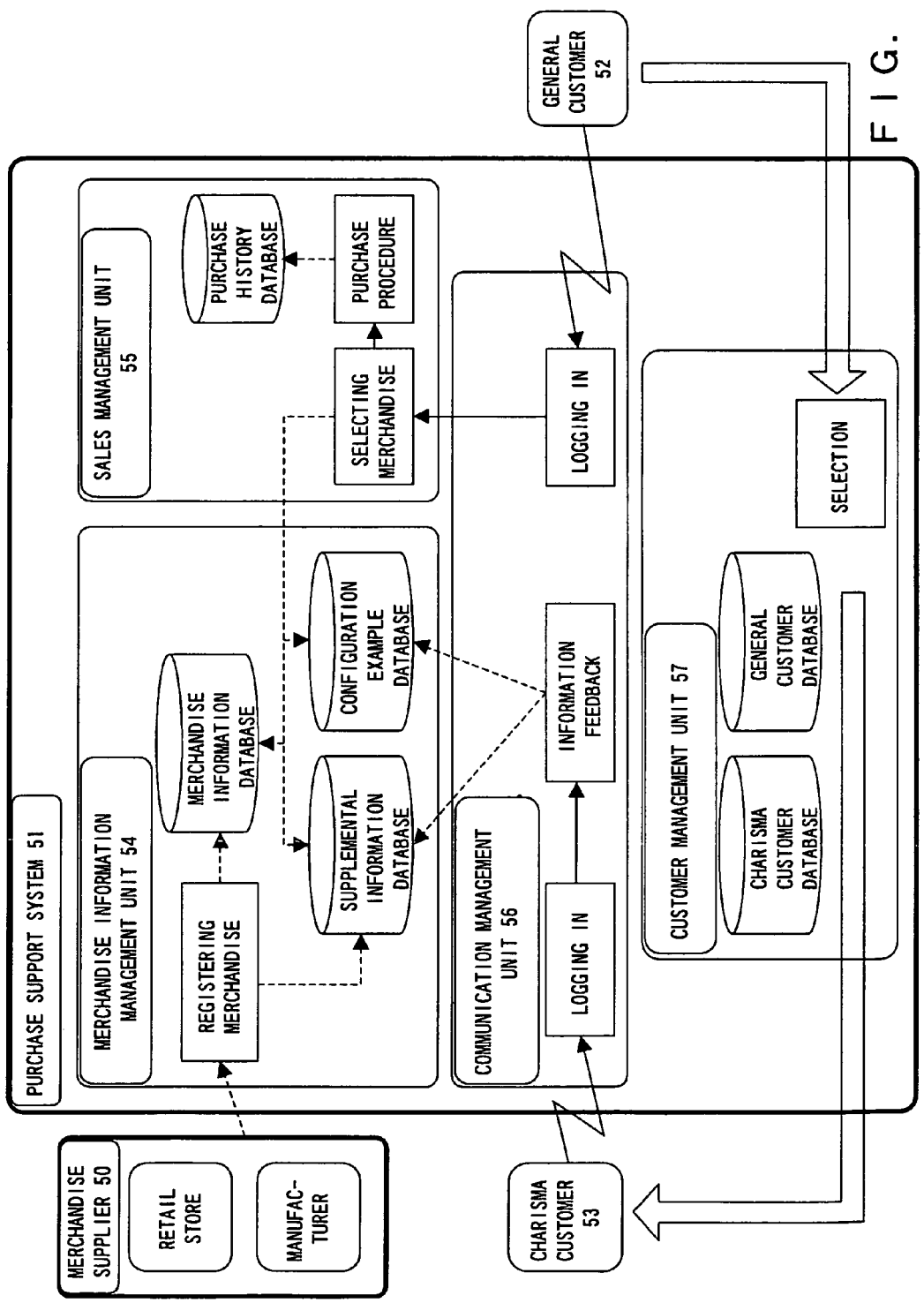
FIG. 15 is a block diagram of the system that provides information concerning the sale of the merchandise and the configuration example of the merchandise to help a store sell the merchandise, which is one mode for realizing the embodiment of the present invention.

FIG. 15 is a block diagram of the system that provides information concerning the sale of the merchandise and the configuration example of the merchandise to help a store sell the merchandise, which is one mode for realizing the present invention.

This system comprises merchandise suppliers 50 consisting of retail shops and manufacturers, a purchase supporting system 51, general customers 52 and charisma customers 53. The purchase supporting system 51 comprises an information management unit 54 that manages information concerning the merchandise registered from the merchandise suppliers 50, a sales management unit 55 that manages the sales of merchandise and the history of the sales, a communication management unit 56 that manages the connection between the customers and the system, and a customer management unit 57 that manages customer information and selects charisma customers 53 from among general customers 52.

The merchandise information registered from the merchandise suppliers 50 is stored in the merchandise information database, the supplemental information database, and the configuration example database in the merchandise information management unit 54. The sales management unit 55 owns the purchase history database that manages the purchase history in which a general customer logs in to the purchase supporting system via the communication management unit 56, selects the merchandise he wants to purchase, and purchases it A charisma customer 53 logs in to the purchase supporting system 51 via the communication management unit 56, and feeds back the information. The fed back information is registered in the supplemental information database and the configuration example database of the merchandise management unit 54. When selecting charisma customers from among general customers 52, the customer management unit 57 selects charisma customers by receiving self-recommendation from them or a recommendation from the store. At that time said unit refers to the information about said general customers and the information on the existing charisma customers, which are stored in the general customer database and the charisma customer database, respectively.

Figure 16:
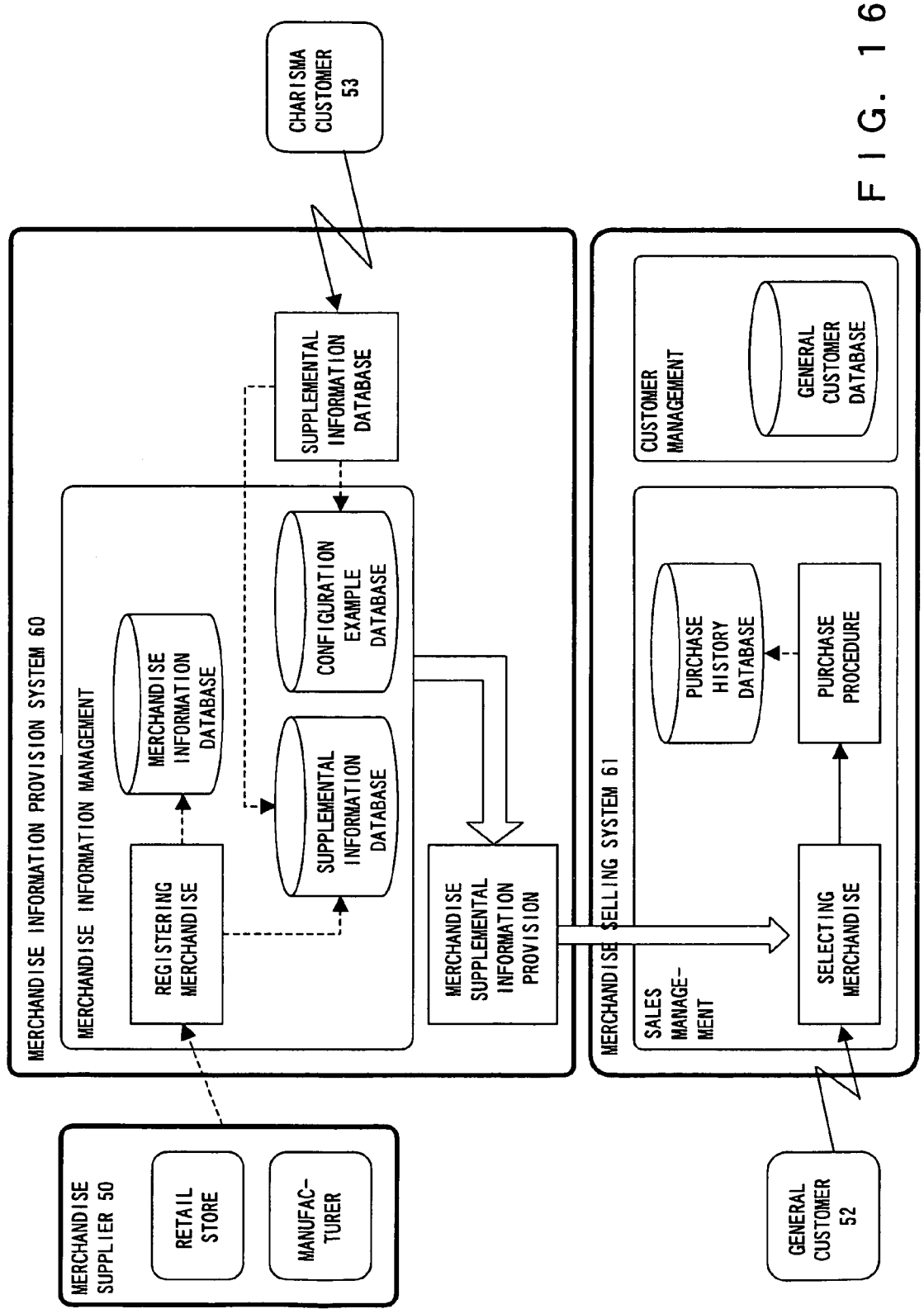
FIG. 16 is a block diagram of a merchandise information provision system that provides information concerning the configuration example of the merchandise independently of the sale of the merchandise, in the mode for realizing the embodiment of the present invention.

FIG. 16 is a block diagram of the merchandise information provision system that provides information concerning configuration examples of the merchandise independently of the sale of the merchandise, in the mode for realizing the present invention.

In the configuration of this system, the process in the above-mentioned mode is executed as a merchandise information provision system, which provides the service of supplying useful information to the merchandise selling system when customers select merchandise with a conventional merchandise selling system.

Some of the conventional merchandise selling systems employ the method of comparing the customer attribute information and merchandise information, and of supplying and selling the merchandise suitable for each customer. In this method, however, it is tremendously costly to make the rules for determining which piece of merchandise should be suggested and what customer attribute should be suggested. In the case of the merchandise combination to be also suggested to the customers, a similar cost problem existed with the store. The mode for realizing the present invention makes the service of providing supplemental information and configuration information of merchandise possible.

The purchase supporting system shown in FIG. 15 is divided into the merchandise information provision system 60 and the merchandise selling system 61, as shown in FIG. 16, and the merchandise selling system 61 specializes in the sale of merchandise to general customers 52. Therefore, general customers performs merchandise selection and the purchase procedure in the merchandise selling system 61. Also, the general customer database that stores information on general customers is contained in the merchandise selling system 61. However, the merchandise selling system 61 differs from the conventional systems in that it provides general customers with supplemental merchandise information supplied from the merchandise information provision system 60 when they select merchandise so that general customers can purchase merchandise more effectively.

The merchandise information provision system 60 can be installed in a company different from the one where the merchandise selling system 61 is installed. It is quite possible for a company having the merchandise information provision system to sell merchandise information to another company having the merchandise selling system 61 and thereby gain a profit. The merchandise information provision system 60 receives merchandise registration information from merchandise suppliers 50 and also collects supplemental information concerning merchandise from charisma customers 53. Then, it stores the registered merchandise information and the collected supplemental information in the merchandise information database, the supplemental information database and the configuration example database, and provides the merchandise information to the merchandise selling system 61.

Here, it is necessary to select charisma customers from among general customers. In that case, the merchandise selling system 61 and the merchandise information provision system 60 cooperate with each other and select charisma customers from among general customers in the above-mentioned mode for processing.

Figure 17:
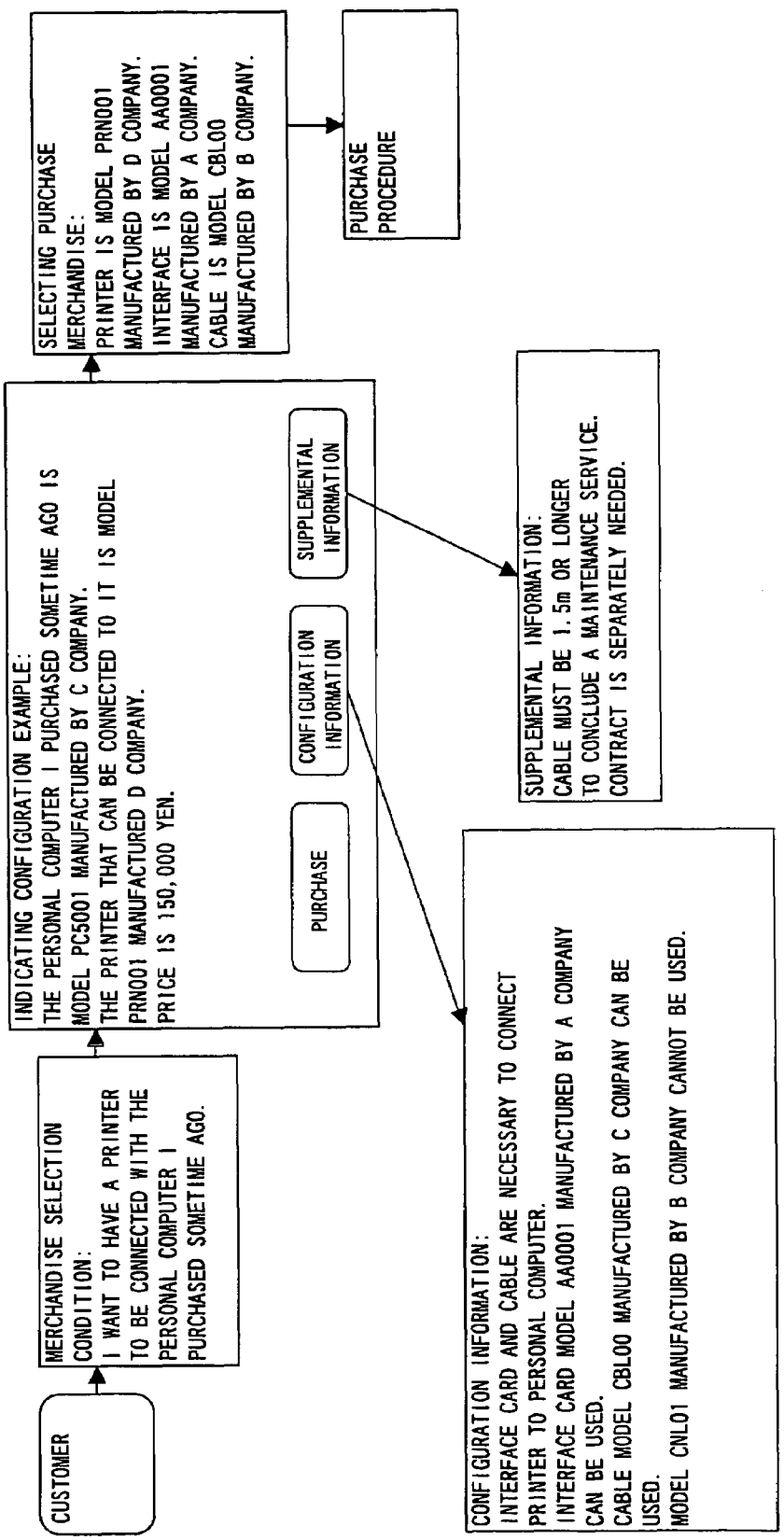
FIG. 17 is a display example of the configuration information and supplemental information of the merchandise which is displayed when the system used for selling a personal computer is taken as an example, in the mode for realizing the embodiment of the present invention.

FIG. 17 is a display example of the configuration information and supplemental information of the merchandise which is displayed when the system used for selling a personal computer is taken as an example, in the mode for realizing the present invention.

Suppose that a customer wants to purchase a printer to be connected to a personal computer he purchased sometime ago. The system in the mode for realizing the invention extracts the type of the personal computer the customer purchased before from the purchase history database, extracts the merchandise configuration including the personal computer and the printer the customer is planning to purchase from the configuration example database, and provides it, together with the merchandise information on the printer, to the customer.

Configuration information and supplemental information are registered in the configuration examples, and the customer can refer to these pieces of information. In this case, the type of the cable and the interface are equipment required for connecting the personal computer to the printer and are included in the configuration information. Since information concerning the cables that cannot be used for the connection is also provided, the customer can judge whether he has mistakenly purchased an unconnectable cable or whether the connection is possible with the cable he already has, thus making it possible for the customer to determine which cable he should purchase. He can also obtain information about the length of the cable, the maintenance contract that is required when these devices are actually used, and so on as examples of merchandise supplemental information.

The customer can refer to these pieces of merchandise-related information and proceeds to the purchase procedure while reducing the risk of making a wrong selection. In the mode for realizing the invention the customer can receive information concerning the merchandise configuration and merchandise combination required at the time of purchase when he purchases merchandise, so that he can avoid such problems as: merchandise partially or totally inoperable due to having selected a wrong configuration; unnecessary purchase made.

In addition, it is possible to help the customer make a selection, when he is selecting the merchandise he wants to purchase from among many pieces of merchandise. This help includes help in selecting the kind of merchandise for which the customer cannot easily express his desire merely by designating simple selection conditions required for a single piece of merchandise.

In addition, the party selling the merchandise can provide merchandise information while suppressing the cost required to provide the configuration of certain merchandise. Not only do charisma customers receive incentives for feeding information back to the store, and can thereby purchase merchandise on a preferential basis, but also a large number of general customers can make use of the knowledge on merchandise owned by excellent customers that could not be used in the past.

This invention makes it possible to build a purchase supporting system over a communication network that copes with the needs of customers more accurately and suppresses the cost on the part of the seller of merchandise.

What is claimed is:

1. A purchase supporting method of supporting network-based shopping that provides combination information to online shopping customers when shopping over a network to purchase merchandise, comprising:
    selecting particular lead customers from among electronically stored general customers;
    storing information about the particular lead customers separately from the general customers;
    collecting over the network from the particular lead customers feedback combination information concerning the merchandise that the particular lead customers purchased, where the feedback combination information comprises information inputted by the particular lead customers and information indicating the particular lead customers' objective findings about using the merchandise in combination with other different merchandise;
    during online shopping sessions when the shopping customers have indicated over the network an interest in purchasing the merchandise, providing over the network to the shopping customers collected individual feedback combination information concerning using the merchandise in combination with other different merchandise; and
    associating information related to usefulness of the feedback combination information with the feedback combination information;
    wherein the information about the particular lead customer includes a reference to the feedback combination information and the reference is associated with identification information of the particular lead customer who sent the feedback combination; and
    wherein the particular lead customer is provided with an opportunity to purchase discounted merchandise based on incentive points earned by the particular lead customer when the information related to usefulness is considered useful.

2. The purchase supporting method as in claim 1, wherein the particular lead customers are selected from among general customers based upon their degree of knowledge about merchandise and a degree of influence that their opinions have upon the general customers.

3. The purchase supporting method as in claim 1, wherein the feedback combination information concerning the merchandise comprises at least one of a configuration of the merchandise that the particular lead customers have already selected, merits and problems encountered after the particular lead customers purchased the merchandise, or precautions to be observed at the time of purchase.

4. The purchase supporting method as in claim 1, further comprising:
    providing the particular lead customers with an incentive including at least one of a preferential sale, trial use and discount sale of new merchandise.

5. The purchase supporting method as in claim 4, further comprising:
    evaluating a usefulness of the above-mentioned information and adding incentive points to the particular lead customer in accordance with said usefulness.

6. The purchase supporting method as in claim 4, wherein providing the incentive includes determining which merchandise should be provided on a preferential basis to the particular lead customers to whom an incentive is to be given in accordance with their age, occupation, characteristics, interest and ability.

7. The purchase supporting method as in claim 4, wherein operation is executed to determine whether the merchandise information collected from the particular lead customers is the information concerning the merchandise the customers purchased on a preferential basis based upon the incentive.

8. The purchase supporting method as in claim 1, further comprising:
    processing merchandise information collected from the particular lead customers, as needed, and accumulating and managing said information.

9. The purchase supporting method as in claim 1, wherein the method transmits a list of purchasable articles and information concerning the merchandise meeting a customer's requirements to a customer's terminal via a network, and executes an on-line purchase procedure for the merchandise that said customer selects from said list of purchasable articles.

10. The purchase supporting method as in claim 1, wherein a usefulness of the merchandise information collected from the particular lead customers is evaluated.

11. The purchase supporting method as in claim 10, wherein the method evaluates the usefulness based upon whether the merchandise information is already-known information, whether the merchandise information has general versatility and whether the reliability of the merchandise information is high.

12. The purchase supporting method as in claim 1, wherein the method specifies configuration examples of merchandise based upon the merchandise information collected from the particular lead customers in response to the merchandise purchase request from the general customers.

13. A purchase supporting system for supporting network-based shopping that provides combination information online shopping customers purchase a piece of merchandise so that they may purchase online merchandise more effectively, comprising:
    a merchandise information collection unit collecting over the network from particular lead customers feedback combination information concerning the merchandise that the particular lead customers purchased, where the feedback combination information comprises information inputted by the particular lead customers and information indicating the particular lead customers' objective findings about using the merchandise in combination with other different merchandise; and an information provision unit that, during online shopping sessions when the shopping customers have indicated over the network an interest in purchasing the merchandise, provides over the network to the shopping customers collected individual feedback combination information concerning using the merchandise in combination with other merchandise and associates information related to usefulness of the feedback combination information with the feedback combination information;

wherein information about the particular lead customers is separately stored from information about general customers, and includes a reference to the feedback combination information and the reference is associated with identification information of the particular lead customer who sent the feedback combination; and wherein the particular lead customer is provided with an opportunity to purchase discounted merchandise based on incentive points earned by the particular lead customer when the information related to usefulness is considered useful.

14. The purchase supporting system as in claim 13, wherein the particular lead customers are selected from among general customers, based upon their degree of knowledge about merchandise and the degree of influence that their opinions have upon the general customers.

15. The purchase supporting system as in claim 13, wherein the feedback combination information concerning the merchandise comprises at least one of the configuration of the merchandise that the particular lead customers have already selected, merits and problems encountered after they have purchased the merchandise, or precautions to be observed at a time of purchase.

16. The purchase supporting system as in claim 13, wherein the system provides the particular lead customers with an incentive including at least one of a preferential sale, trial use and discount sale of new merchandise.

17. The purchase supporting system as in claim 16, wherein the system evaluates the usefulness of the merchandise information collected from the particular lead customers and adds a plurality of incentive points to said particular lead customers in accordance with the degree of usefulness.

18. The purchase supporting system as in claim 16, wherein operation is executed to determine which merchandise should be provided on a preferential basis to the particular lead customers to whom an incentive is to be given in accordance with the customer's age, occupation, characteristics, interest and ability.

19. The purchase supporting system as in claim 16, wherein the system determines whether the merchandise information collected from the particular lead customers is the information concerning the merchandise purchased on a preferential basis based upon the incentive.

20. The purchase supporting system as in claim 13, wherein the system processes the merchandise information collected from the particular lead customers, as needed, and accumulates and manages it the merchandise information.

21. The purchase supporting system as in claim 13, wherein the system transmits a list of purchasable articles and information meeting a shopping customer's requirements to the customer's terminals via a network, and executes an on-line purchase procedure of the merchandise the customer has selected from said list of purchasable articles.

22. The purchase supporting system as in claim 13, wherein the system evaluates the usefulness of the merchandise information collected from the particular lead customers.

23. The purchase supporting system as in claim 22, wherein the system executes the evaluation of the usefulness based upon such standards as whether the merchandise information is already-known information, whether there is general versatility in said merchandise information, and whether the reliability of said merchandise information is high.

24. The purchase supporting system as in claim 13, wherein the system specifies a plurality of merchandise configuration examples based upon the merchandise information collected from the particular lead customers in response to the request for merchandise purchase from the general customers.

25. A computer-implemented method of supporting network-based shopping, comprising:

storing feedback combination information of merchandises from particular lead customers selected from customers who have purchased merchandises that meet a predefined standard, the feedback combination information including compatibility information of the merchandises with respect to each other;

associating information related to usefulness of the feedback combination information with the feedback combination information; and providing the stored feedback combination information including the compatibility information of the merchandises with respect to a merchandise when a customer is shopping for the merchandise via a network, wherein information about a particular lead customer includes a reference to feedback combination information and the reference is associated with identification information of the particular lead customer who sent the feedback combination; and wherein the particular lead customer is provided with an opportunity to purchase discounted merchandise based on incentive points earned by the particular lead customer when the information related to usefulness is considered useful.

* * * * *

UNITED STATES PATENT AND TRADEMARK OFFICE
CERTIFICATE OF CORRECTION

PATENT NO. : 7,346,536 B2 Page 1 of 1
APPLICATION NO. : 09/789676
DATED : March 18, 2008
INVENTOR(S) : Kazumi Kubota It is certified that error appears in the above-identified patent and that said Letters Patent is hereby corrected as shown below:

Title Page, Column 2 (Other Publications), Line 6-7, below "No. 2001-308089, mailing date Mar. 13, 2007." delete "Decision to Reject in corresponding Japanese Patent Application No. 2001-308089, mailing date Mar. 13, 2007.". (Second Occurrence)

Column 17, Line 57, after "combination" delete ";" and insert --information;--.

Column 18, Line 7, change "the" to --a--.

Column 19, Line 18, after "combination" delete ";" and insert --information;--.

Column 20, Line 4, after "manages" delete "it".

Column 20, Line 48, after "combination" delete ";" and insert --information;--.

Signed and Sealed this

Nineteenth Day of August, 2008

JON W. DUDAS
*Director of the United States Patent and Trademark Office*